United States Patent
Kimura et al.

(10) Patent No.: US 12,140,925 B2
(45) Date of Patent: Nov. 12, 2024

(54) POSITIONING CONTROL DEVICE AND POSITIONING METHOD

(71) Applicant: Mitsubishi Electric Corporation, Tokyo (JP)

(72) Inventors: Masaya Kimura, Tokyo (JP); Hidetoshi Ikeda, Tokyo (JP); Naoto Takano, Tokyo (JP); Hideyuki Masui, Tokyo (JP); Daisaku Matsumoto, Tokyo (JP); Atsunori Kanemura, Tokyo (JP); Hideki Asoh, Ibaraki (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 633 days.

(21) Appl. No.: 17/280,190

(22) PCT Filed: Jan. 30, 2019

(86) PCT No.: PCT/JP2019/003205
§ 371 (c)(1),
(2) Date: Mar. 26, 2021

(87) PCT Pub. No.: WO2020/075316
PCT Pub. Date: Apr. 16, 2020

(65) Prior Publication Data
US 2022/0004160 A1 Jan. 6, 2022

(30) Foreign Application Priority Data
Oct. 12, 2018 (JP) .................. 2018-193380

(51) Int. Cl.
*G05B 19/19* (2006.01)
*G05B 19/404* (2006.01)
*G05B 19/418* (2006.01)

(52) U.S. Cl.
CPC ....... *G05B 19/19* (2013.01); *G05B 19/41885* (2013.01); *G05B 19/404* (2013.01)

(58) Field of Classification Search
CPC . G05B 19/19; G05B 19/41885; G05B 19/404
See application file for complete search history.

(56) References Cited

U.S. PATENT DOCUMENTS

| | | | |
|---|---|---|---|
| 2013/0173026 A1* | 7/2013 | Kawana | ............ G05B 5/01 700/30 |
| 2014/0156080 A1* | 6/2014 | Iwashita | ............ H02P 23/00 700/275 |

(Continued)

FOREIGN PATENT DOCUMENTS

| | | |
|---|---|---|
| JP | 4-324507 A | 11/1992 |
| JP | 10-143249 A | 5/1998 |

(Continued)

OTHER PUBLICATIONS

International Search Report and Written Opinion mailed on Apr. 23, 2019, received for PCT Application PCT/JP2019/003205 Filed on Jan. 30, 2019, 10 pages including English Translation.

(Continued)

*Primary Examiner* — Zoheb S Imtiaz
(74) *Attorney, Agent, or Firm* — XSENSUS LLP

(57) ABSTRACT

A positioning control device includes a position-command generation unit to generate a position command by which a shape of an acceleration in an accelerating section and a decelerating section is determined on the basis of a position command parameter, a drive control unit to drive a motor such that a detected position value of the motor or a control target follows the position command, an evaluation unit to calculate an evaluation value regarding positioning performance on the basis of a detected position value of the motor or the control target during execution of positioning control on the control target, and a learning unit to obtain a learning (Continued)

result by learning a relation between the position command parameter and the evaluation value when positioning control is executed plural times, while changing each of shapes of an acceleration in an accelerating section and a decelerating section independently.

26 Claims, 15 Drawing Sheets

(56) References Cited

U.S. PATENT DOCUMENTS

| | | | | |
|---|---|---|---|---|
| 2016/0077505 A1* | 3/2016 | Dirkx | ............... | G05B 17/02 700/275 |
| 2017/0212495 A1* | 7/2017 | Okita | ............ | G05B 19/4063 |
| 2018/0101166 A1* | 4/2018 | Aldridge | ............ | B25J 9/1671 |
| 2019/0107848 A1* | 4/2019 | Kosaka | ............ | G05D 3/12 |

FOREIGN PATENT DOCUMENTS

| | | |
|---|---|---|
| JP | 2004-240609 A | 8/2004 |
| JP | 2007-34781 A | 2/2007 |
| JP | 2009-122779 A | 6/2009 |
| JP | 2016-19304 A | 2/2016 |
| JP | 2016-24713 A | 2/2016 |
| TW | 201330486 A1 | 7/2013 |

OTHER PUBLICATIONS

Notification Reason for Refusal mailed on Jul. 28, 2020, received for TW Application 109102714, 16 pages including English Translation.

\* cited by examiner

FIG.10
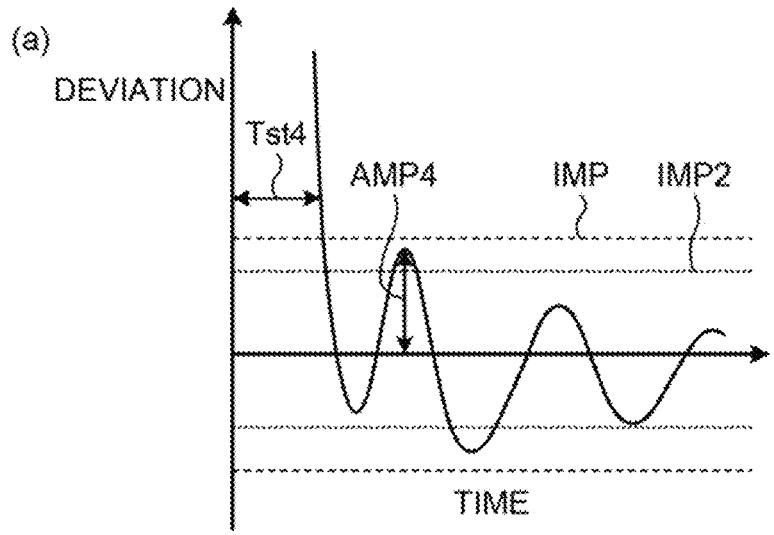
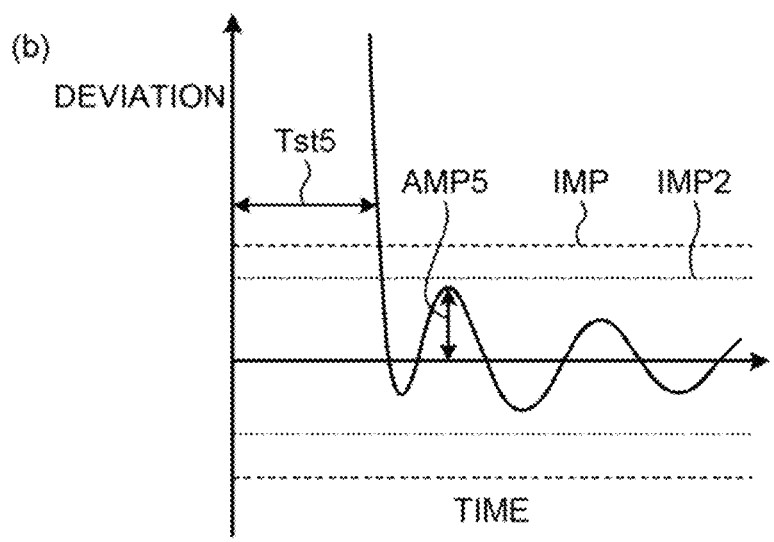

POSITIONING CONTROL DEVICE AND POSITIONING METHOD

CROSS-REFERENCE TO RELATED APPLICATIONS

The present application is based on PCT filing PCT/JP2019/003205, filed Jan. 30, 2019, which claims priority to JP 2018-193380, filed Oct. 12, 2018, the entire contents of each are incorporated herein by reference.

FIELD

The present invention relates to a positioning control device and a positioning method to execute positioning control on a control target.

BACKGROUND

In a device such as an electronic-component installation device or a semiconductor manufacturing device in which a head that is a control target is moved repetitively by driving of a servo motor, it is desired to control the servo motor at high speed in order to improve production performance. When the servo motor operates at high speed, mechanical vibrations may be generated due to low rigidity of the device. In this case, assuming that a command shape of a position command for the servo motor is properly adjusted, high-speed positioning control can be achieved even under the circumstances where the control is affected by the mechanical vibrations. It is thus desired to properly adjust the command shape of the position command.

As a conventional technique to adjust a command shape for a servo motor, techniques described in Patent Literatures 1, 2, and 3 listed below are proposed. Patent Literature 1 discloses a technique to find an optimum command shape in a simulation using a model of a control target by repeating search for a command shape by using a genetic algorithm and evaluation of a response of the model of the control target in the simulation. The technique disclosed in Patent Literature 1 is means of adjusting the command shape by using the simulation.

Patent Literature 2 discloses a technique to find an optimum command shape in a simulation and thereafter search for a command shape by using a real device. The feature of the technique disclosed in Patent Literature 2 is determination of a search range on the basis of the optimum command shape found in the simulation in the search for the command shape by using a real device. Patent Literatures 1 and 2 both disclose the technique to adjust the command shape through utilization of a simulation.

Patent Literature 3 discloses a technique to prepare and hold a plurality of command shapes in advance, and to perform a positioning operation with a real device on each of the command shapes and check a response to thereby search for a command shape indicating an appropriate response.

CITATION LIST

Patent Literatures

Patent Literature 1: Japanese Patent Application Laid-open No. 2004-240609
Patent Literature 2: Japanese Patent Application Laid-open No. 2009-122779
Patent Literature 3: Japanese Patent Application Laid-open No. 2016-19304

SUMMARY

Technical Problem

As described above, Patent Literatures 1 and 2 both disclose the technique to adjust a command shape through utilization of a simulation. Patent Literature 1 discloses the technique to simulate a response of the real device to optimize the command shape. This technique needs a mathematical model of a real device in order to simulate the response of the real device. Since, in general, a modeling error is included in a mathematical model, it is difficult for the mathematical model to perfectly reproduce the response of the real device. An optimum value found in the simulation is different from an optimum value for a real device. Thus, even when an optimum command shape found in the simulation is applied to a real device, the real device does not indicate an appropriate response as expected. That is, there is a problem with the technique disclosed in Patent Literature 1 that an appropriate command shape to speed up positioning control for a real device cannot be obtained.

Patent Literature 2 discloses the technique to adjust a command shape by using a real device after a simulation is performed. In this technique, a search range for adjusting a command shape is determined on the basis of the result of the simulation. Thus, there is a possibility, for example, that the search range may not be properly set due to the influence of a modeling error. That is, in the technique disclosed in Patent Literature 2, there is a possibility that the range including an appropriate command shape may not be set as a search range.

Patent Literature 3 discloses the technique to perform a positioning operation with a real device on each of the command shapes prepared in advance and check a response to thereby find an optimal command shape. Since there are an unlimited number of patterns of command shapes to operate a servo motor, a positioning operation with a real device needs to be performed a very large number of times, assuming that the positioning operation is performed on all of the command shapes prepared in advance. Even in an attempt to narrow down and set the search range of the command shape in order to reduce the number of times of positioning operations, means of properly setting the search range is not provided and thus there is still a possibility that there may not be a command shape indicating an appropriate response within the search range. That is, there is a problem with the technique disclosed in Patent Literature 3 that an appropriate command shape cannot be found.

As described above, the conventional techniques cannot efficiently adjust a command shape to speed up positioning control.

The present invention has been achieved to solve the above problems, and an object of the present invention is to provide a positioning control device that efficiently adjusts a command shape to speed up positioning control.

Solution to Problem

In order to solve the above problems and achieve the object, the present invention is a positioning control device that moves a control target by a target movement distance by driving a motor, the positioning control device including a position-command generation unit to generate a position command by which a shape of an acceleration in an accelerating section and a decelerating section is determined on a basis of a position command parameter and a drive control unit to drive the motor such that a detected position value of the motor or the control target follows the position command. The present invention further includes an evaluation unit to calculate an evaluation value regarding positioning performance on a basis of a detected position value of the motor or the control target during execution of positioning control on the control target. Further, the present invention includes a learning unit to obtain a learning result by learning a relation between the position command parameter and the evaluation value when positioning control is executed plural times, while changing each of shapes of an acceleration in an accelerating section and a decelerating section independently, each of the shapes being determined on a basis of the position command parameter.

Advantageous Effects of Invention

The present invention can obtain an effect where it is possible to efficiently adjust a command shape to speed up positioning control.

BRIEF DESCRIPTION OF DRAWINGS

FIG. 10 are diagrams illustrating a response that is a deviation over time in the third embodiment when a fourth set of position command parameters and a fifth set of position command parameters are used.

DESCRIPTION OF EMBODIMENTS

A positioning control device and a positioning method according to embodiments of the present invention will be described in detail below with reference to the drawings. The present invention is not limited to the embodiments.

First Embodiment

Figure 1:
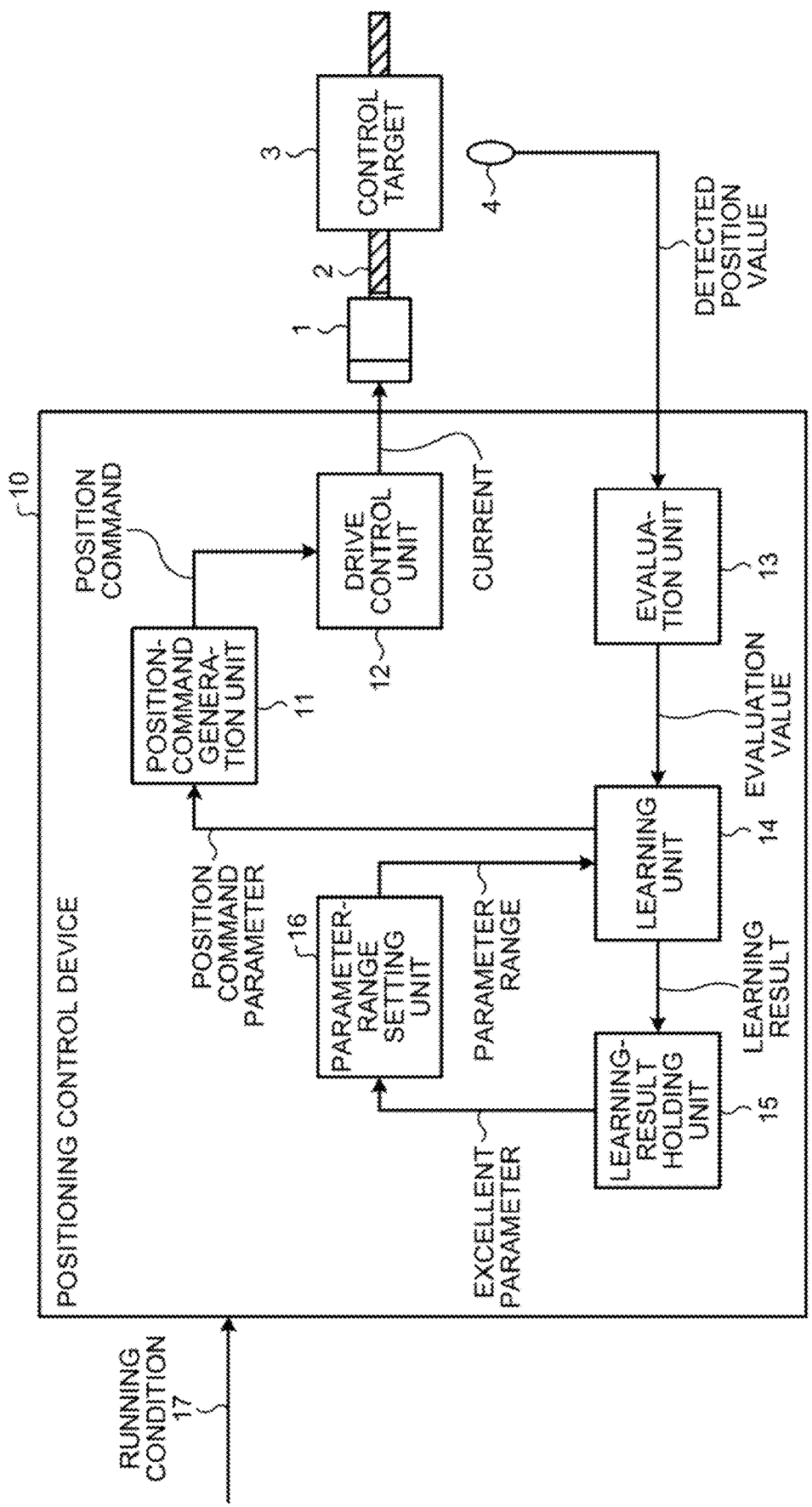
FIG. 1 is a diagram illustrating a configuration of a positioning control device according to a first embodiment.

FIG. 1 is a diagram illustrating a configuration of a positioning control device 10 according to a first embodiment. The positioning control device 10 drives a motor 1 to move a control target 3 by a target movement distance. The positioning control device 10 is connected to the motor 1 and a position detector 4. The motor 1 applies a torque and a thrust to the control target 3 through a ball screw 2 to move the control target 3. The motor 1 may be any type of motor that can drive the control target 3. Examples of the motor 1 include a rotary servo motor, a linear motor, and a stepping motor.

The control target 3 is moved by a desired target movement distance by the motor 1. The control target 3 is a machine or a component on which positioning control needs to be executed. The control target 3 is, for example, a head portion of an electronic-component installation device or a semiconductor manufacturing device.

The position detector 4 detects a rotational position of the motor 1 or a position of the control target 3, and outputs information indicating a detected position value to the positioning control device 10. The detected position value is a result of detection by the position detector 4. Examples of the position detector 4 include an encoder and a linear scale.

The positioning control device 10 is given a running condition 17 from outside of the positioning control device 10. The running condition 17 is information including a target movement distance for driving the motor 1. The target movement distance is a desired distance by which the control target 3 is moved. The positioning control device 10 executes positioning control on the control target 3 so as to satisfy the running condition 17.

The positioning control device 10 includes a position-command generation unit 11 that generates a position command for moving the control target 3 by a target movement distance by driving the motor 1 on the basis of a position command parameter that specifies the shape of the position command. The position-command generation unit 11 generates a position command by which an acceleration shape in an accelerating section and a decelerating section is determined on the basis of the position command parameter. The positioning control device 10 further includes a drive control unit 12 that drives the motor 1 such that the detected position value of the motor 1 or the control target 3 follows the position command generated by the position-command generation unit 11.

The positioning control device 10 further includes an evaluation unit 13 that calculates an evaluation value for evaluating whether positioning control by the drive control unit 12 is executed properly on the basis of the detected position value of the motor 1 or the control target 3 during execution of the positioning control on the control target 3. The evaluation unit 13 calculates an evaluation value regarding positioning performance on the basis of a detected position value of the motor 1 or the control target 3 during execution of the positioning control on the control target 3.

The positioning control device 10 further includes a learning unit 14 that obtains a learning result by learning a relation between a position command parameter and an evaluation value calculated by the evaluation unit 13 when positioning control is executed on the control target 3 plural times after the position command parameter is changed within a parameter range that specifies an upper-limit value and a lower-limit value of the position command parameter. The learning unit 14 obtains a learning result by learning a relation between the position command parameter and the evaluation value when positioning control is executed plural times, while changing each of the shapes of an acceleration in an accelerating section and a decelerating section independently, each of the shapes being determined on the basis of the position command parameter. Furthermore, the learning unit 14 determines a position command parameter on the basis of the learning result.

The positioning control device 10 further includes a learning-result holding unit 15 that holds therein the learning result obtained by the learning unit 14 in association with the running condition 17 including the information indicating the target movement distance. A part of the learning-result holding unit 15 is a storage unit. The storage unit is, for example, a semiconductor memory. The positioning control device 10 further includes a parameter-range setting unit 16 that changes a parameter range on the basis of the running condition 17 and the learning result held in the learning-result holding unit 15. The position-command generation unit 11, the drive control unit 12, the evaluation unit 13, the learning unit 14, the learning-result holding unit 15, and the parameter-range setting unit 16 are further described below.

Figure 2:
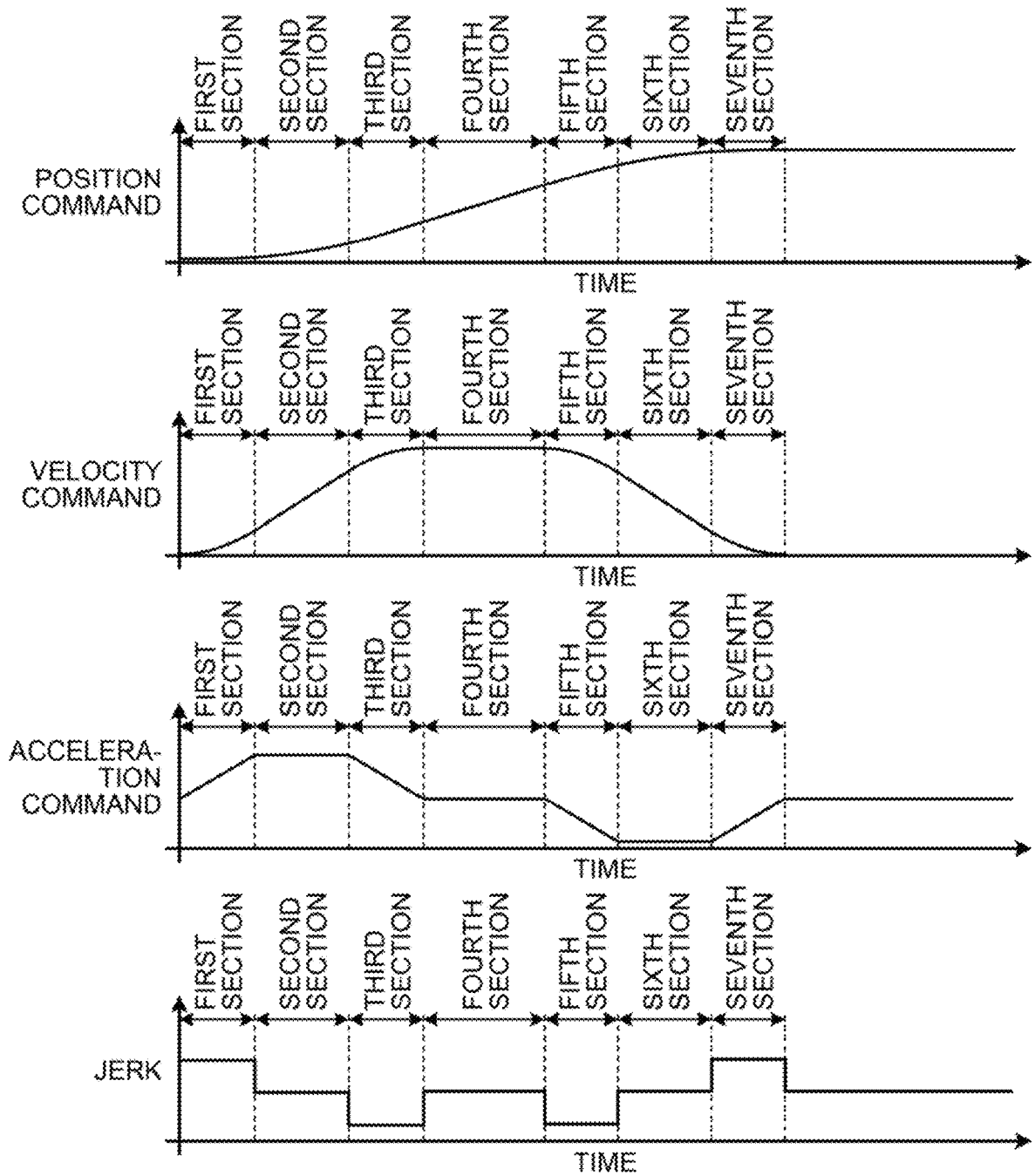
FIG. 2 is a diagram illustrating an example of each of the shapes of a position command used in the first embodiment, a velocity command obtained by the first-order differential of the position command, an acceleration command obtained by the second-order differential of the position command, and a jerk obtained by the first-order differential of the acceleration command.

The position-command generation unit 11 generates and outputs a position command for the motor 1 on the basis of a position command parameter and the running condition 17. The position command parameter is a parameter that specifies a command shape of the position command. FIG. 2 is a diagram illustrating an example of each of the shapes of a position command used in the first embodiment, a velocity command obtained by the first-order differential of the position command, an acceleration command obtained by the second-order differential of the position command, and a jerk obtained by the first-order differential of the acceleration command. FIG. 2 illustrates the example of the shapes of the commands and the jerk when the running condition 17 including the information indicating the target movement distance is given to the positioning control device 10.

As illustrated in FIG. 2, the acceleration command according to the first embodiment is a command indicating a trapezoidal shape in an accelerating direction from the first section to the third section, then indicating zero in the fourth section, and then indicating a trapezoidal shape in a decelerating direction from the fifth section to the seventh section. The first section indicates an accelerating start section. The third section indicates an accelerating end section. The fifth section indicates a decelerating start section. The seventh section indicates a decelerating end section. The time length of an m-th section is represented as an m-th time length Tm. m is an integer ranging from 1 to 7. That is, the time length of the first section is represented as a first time length T1.

In the acceleration command in FIG. 2, the trapezoidal shape in the accelerating section from the first section to the third section, and the trapezoidal shape in the decelerating section from the fifth section to the seventh section may not be congruent with each other. It is allowable that the acceleration command is set to 0 for the first time length T1 and the third time length T3 in the accelerating section such that the acceleration command has a rectangular shape. In the first embodiment, seven parameters including the first time length T1 to the seventh time length T7 are position command parameters. The command shape is specified on the basis of the position command parameters and the target movement distance. A method for calculating the command shape is described later.

The drive control unit 12 supplies a current to the motor 1 in such a manner that the rotational position of the motor 1 follows the position command. For example, the drive control unit 12 acquires information indicating a rotational position of the motor 1 from the position detector 4, and calculates a value of the current to be supplied to the motor 1 on the basis of Proportional-Integral-Differential (PID) control such that a deviation between the rotational position of the motor 1 and the position command is reduced. The drive control unit 12 then supplies a current with its value obtained by the calculation to the motor 1. The drive control unit 12 may be any type of unit as long as the unit causes the rotational position of the motor 1 to follow the position command. For example, the drive control unit 12 may execute two-degree-of-freedom control in which feedforward control is added to feedback control.

The drive control unit 12 may not drive the motor 1 in such a manner that the rotational position of the motor 1 follows the position command, but may detect the position of the control target 3 as a signal for the feedback control and drive the motor 1 in such a manner that the position of the control target 3 follows the position command.

The evaluation unit 13 receives information indicating a detected position value from the position detector 4, which is the result of the detection by the position detector 4, calculates an evaluation value Q for evaluating whether positioning control by the drive control unit 12 is executed properly by using a method described later, and then outputs the calculated evaluation value Q. The drive control unit 12 operates on the basis of a position command. The position command is calculated on the basis of a position command parameter. Therefore, the evaluation value Q calculated by the evaluation unit 13 depends on the value of the position command parameter. That is, the evaluation value Q is regarded as an indicator for evaluating the position command parameter.

Next, a specific method for calculating the evaluation value Q is described. A time from the start of positioning control to the completion of the positioning is defined as a positioning time Tst. At the completion of the positioning, the deviation between a target movement distance and a detected position value becomes smaller than an allowable value IMP determined in advance. The following equation (1) is set such that the evaluation value Q indicates a larger value when the value of the positioning time Tst is smaller.

[Equation 1]

$$Q = -Tst \qquad (1)$$

In accordance with the equation (1), as the value of the positioning time Tst is smaller, the evaluation value Q becomes larger. That is, in the first embodiment, as the evaluation value Q becomes larger, the position command parameter is considered to be more excellent. However, the evaluation value Q is not limited to the value determined by the equation (1) as long as positioning control can be evaluated by the evaluation value Q. For example, it is allowable that the positioning time Tst itself is used as the evaluation value Q, and as the evaluation value Q becomes smaller, the position command parameter is defined as a more excellent parameter.

The learning unit 14 receives input of the evaluation value Q and a parameter range, learns a relation between the position command parameter and the evaluation value Q, and outputs a learning result. Specifically, in the learning unit 14, a neural network is configured to which a position command parameter is input and from which the evaluation value Q is output. The learning unit 14 performs learning by updating a weight coefficient in the neural network. In a case where the learning unit 14 performs learning by updating the weight coefficient, the neural network outputs an appropriate estimated value of the evaluation value Q corresponding to the position command parameter. The learning unit 14 uses the neural network to obtain a function to which the position command parameter is input and from which the evaluation value Q is output, to thereby obtain a relational expression between the position command parameter and the evaluation value Q as a learning result. As long as the learning unit 14 can learn the relation between the position command parameter and the evaluation value Q, the learning unit 14 does not necessarily employ the method using the neural network to learn the relation between the position command parameter and the evaluation value Q.

The learning unit 14 selects a position command parameter for executing the next positioning control within a parameter range to be specified, and outputs the selected position command parameter. It is allowable in selecting the next position command parameter that the learning unit 14 selects a position command parameter indicating an excellent evaluation value on the basis of a learning result, or selects a position command parameter in turn from among the position command parameters at the grid points located at equal intervals. The learning unit 14 has a function of updating the function expression to calculate the evaluation value Q on the basis of a position command parameter.

The learning-result holding unit 15 receives input of a learning result from the learning unit 14, and holds therein the learning result in association with the target movement distance. The learning-result holding unit 15 obtains a position command parameter at which the evaluation value Q is maximized by numerical calculation on the basis of the learning result that is a relational expression between the position command parameter and the evaluation value Q.

For example, the learning-result holding unit 15 obtains a position command parameter at which the evaluation value Q is maximized by using an optimization algorism such as grid search, random search, or the Newton's method.

The learning-result holding unit 15 obtains the position command parameter at which the evaluation value Q is maximized as an excellent parameter (first excellent parameter), and outputs the excellent parameter in association with the target movement distance. However, the learning-result holding unit 15 does not need to obtain a position command parameter at which the proper maximum of the evaluation value Q is obtained among the position command parameters satisfying the relational expression between the position command parameter and the evaluation value Q. It is sufficient that the learning-result holding unit 15 defines a position command parameter indicating appropriate positioning control satisfying the criteria determined in advance as an excellent parameter. The learning-result holding unit 15 has a function of holding therein one or more of the position command parameters as an excellent parameter.

The parameter-range setting unit 16 determines a parameter range that specifies an upper-limit value and a lower-limit value of the position command parameter on the basis of the excellent parameter and a target movement distance indicated by the information included in the running condition 17. On the basis of a learning result obtained by the learning unit 14, the parameter-range setting unit 16 sets the parameter range that specifies an upper-limit value and a lower-limit value of the position command parameter. The parameter-range setting unit 16 sets the parameter range by defining a value smaller than the excellent parameter held by the learning-result holding unit 15 as a lower limit of the parameter range, and by defining a value larger than the excellent parameter held by the learning-result holding unit 15 as an upper limit of the parameter range.

When there is a change in the target movement distance indicated by the information included in the running condition 17, the parameter-range setting unit 16 performs interpolation calculation on the basis of the target movement distance at the time when learning has been performed previously to estimate an excellent parameter at an interpolating point corresponding to the changed target movement distance. In addition, the parameter-range setting unit 16 sets the parameter range by defining a value smaller than the estimated excellent parameter at the interpolating point as a lower limit of the parameter range, and by defining a value larger than the estimated excellent parameter at the interpolating point as an upper limit of the parameter range.

For example, the parameter-range setting unit 16 creates a linear function expression indicating a relation between a target movement distance and an excellent parameter. When there is a change in the target movement distance, the parameter-range setting unit 16 obtains an estimated value of an excellent parameter for the changed target movement distance on the basis of the created linear function expression. The parameter-range setting unit 16 sets a value larger than the estimated value of an excellent parameter as an upper-limit value, while setting a value smaller than the estimated value of an excellent parameter as a lower-limit value. In a case where there are a plurality of position command parameters, the parameter-range setting unit 16 sets an upper-limit value and a lower-limit value for each of the position command parameters.

As long as the parameter-range setting unit 16 can obtain an estimated value of an excellent parameter corresponding to a newly-set target movement distance, it is allowable that the parameter-range setting unit 16 calculates an estimated value of an excellent parameter on the basis of the rule other than the linear function expression indicating the relation between the excellent parameter and the target movement distance.

Functions of the positioning control device 10 according to the first embodiment are further described below. The learning unit 14 determines a set of position command parameters within a range defined by the parameter range, and outputs the determined position command parameters to the position-command generation unit 11. The position-command generation unit 11 calculates a position command on the basis of the input position command parameters.

A method for calculating a position command is now described. An acceleration in the second section is defined as Aa. An acceleration in the sixth section is defined as Ad. Since the acceleration Aa in the second section and the acceleration Ad in the six section are dependent variables of the position command parameter, there is no degree of freedom for setting these accelerations Aa and Ad. The position-command generation unit 11 calculates an acceleration command A1, a velocity command V1, and a position command P1 in the first section at a time t within the range "0≤t<T1" by using the following equations (2), (3), and (4), respectively.

[Equation 2]
$$A1(t) = \int_0^t \frac{Aa}{T1} d\tau \quad (2)$$

[Equation 3]
$$V1(t) = \int_0^t A1(\tau) d\tau \quad (3)$$

[Equation 4]
$$P1(t) = \int_0^t V1(\tau) d\tau \quad (4)$$

The position-command generation unit 11 calculates an acceleration command A2, a velocity command V2, and a position command P2 in the second section at the time t within the range "T1≤t<T1+T2" by using the following equations (5), (6), and (7), respectively.

[Equation 5]
$$A2(t) = Aa \quad (5)$$

[Equation 6]
$$V2(t) = V1(T1) + \int_{T1}^t A2(\tau) d\tau \quad (6)$$

[Equation 7]
$$P2(t) = P1(T1) + \int_{T1}^t V2(\tau) d\tau \quad (7)$$

The position-command generation unit 11 calculates an acceleration command A3, a velocity command V3, and a position command P3 in the third section at the time t within the range "T1+T2≤t<T1+T2+T3" by using the following equations (8), (9), and (10), respectively.

[Equation 8]
$$A3(t) = Aa + \int_{T1+T2}^t \frac{-Aa}{T3} d\tau \quad (8)$$

[Equation 9]
$$V3(t) = V2(T1+T2) + \int_{T1+T2}^t A3(\tau) d\tau \quad (9)$$

[Equation 10]
$$P3(t) = P2(T1+T2) + \int_{T1+T2}^t V3(\tau) d\tau \quad (10)$$

The position-command generation unit 11 calculates an acceleration command A4, a velocity command V4, and a position command P4 in the fourth section at the time t within the range "T1+T2+T3≤t<T1+T2+T3+T4" by using the following equations (11), (12), and (13), respectively.

[Equation 11]
$$A4(t) = 0 \quad (11)$$

[Equation 12]
$$V4(t) = V3(T1+T2+T3) + \int_{T1+T2+T3}^t A4(\tau) d\tau \quad (12)$$

[Equation 13]
$$P3(t) = P3(T1+T2+T3) + \int_{T1+T2+T3}^t V4(\tau) d\tau \quad (13)$$

The position-command generation unit 11 calculates an acceleration command A5, a velocity command V5, and a position command P5 in the fifth section at the time t within the range "T1+T2+T3+T4≤t<T1+T2+T3+T4+T5" by using the following equations (14), (15), and (16), respectively.

[Equation 14]
$$A5(t) \int_{T1+T2+T3+T4}^t \frac{-Ad}{T5} d\tau \quad (14)$$

[Equation 15]
$$V5(t) = V4(T1+T2+T3+T4) + \int_{T1+T2+T3+T4}^t A5(\tau) d\tau \quad (15)$$

[Equation 16]
$$P5(t) = P4(T1+T2+T3+T4) + \int_{T1+T2+T3+T4}^t V5(\tau) d\tau \quad (16)$$

The position-command generation unit 11 calculates an acceleration command A6, a velocity command V6, and a position command P6 in the sixth section at the time t within the range "T1+T2+T3+T4+T5≤t<T1+T2+T3+T4+T5+T6" by using the following equations (17), (18), and (19), respectively.

[Equation 17]
$$A6(t) = -Ad \quad (17)$$

[Equation 18]
$$V6(t) = V5(T1+T2+T3+T4+T5) + \int_{T1+T2+T3+T4+T5}^t A6(\tau) d\tau \quad (18)$$

[Equation 19]

$$P6(t) = P5(T1+T2+T3+T4+T5) + \int_{T1+T2+T3+T4+T5}^{t} V6(\tau)d\tau \quad (19)$$

The position-command generation unit 11 calculates an acceleration command A7, a velocity command V7, and a position command P7 in the seventh section at the time t within the range "T1+T2+T3+T4+T5+T6≤t≤T1+T2+T3+T4+T5+T6+T7" by using the following equations (20), (21), and (22), respectively.

[Equation 20]

$$A7(t) = -Ad + \int_{T1+T2+T3+T4+T5+T6}^{t} \frac{Ad}{T7} d\tau \quad (20)$$

[Equation 21]

$$V7(t) = \\ V6(T1+T2+T3+T4+T5+T6) + \int_{T1+T2+T3+T4+T5+T6}^{t} A7(\tau)d\tau \quad (21)$$

[Equation 22]

$$P7(t) = \\ P6(T1+T2+T3+T4+T5+T6) + \int_{T1+T2+T3+T4+T5+T6}^{t} V7(\tau)d\tau \quad (22)$$

At the termination time t=T1+T2+T3+T4+T5+T6+T7, the velocity command needs to correspond with 0, and the position command needs to correspond with a target movement distance D. For this reason, at the termination time, the following equations (23) and (24) hold.

[Equation 23]

$$V7 = 0 \quad (23)$$

[Equation 24]

$$P7 = D \quad (24)$$

The acceleration Aa in the second section, and the acceleration Ad in the sixth section are determined by the above equations (5) and (17). As described above, the command shape is calculated on the basis of a command parameter and the target movement distance D.

As described above, and also as illustrated in FIG. 2, the acceleration is a linear function with respect to time in the first section, the third section, the fifth section, and the seventh section. Thus, in these sections, a jerk obtained by the first-order differential of an acceleration is a nonzero constant as illustrated in FIG. 2. That is, the first time length T1, the third time length T3, the fifth time length T5, and the seventh time length T7 are regarded as defining a time during which the jerk is a nonzero constant. The nonzero constant is a constant value larger than zero or smaller than zero.

In these sections, it is allowable to select a parameter that designates the jerk instead of the time length. For example, when the jerk in the first section is defined as J1, the jerk J1 can be calculated by using the first time length T1 as expressed by the following equation (25).

[Equation 25]

$$J1 = \frac{Aa}{T1} \quad (25)$$

Defining a time in the section during which the jerk is a nonzero constant as a parameter is equivalent to defining the jerk in a section during which the jerk is a nonzero constant as a parameter. As described above, the parameter that specifies a command shape can be selected in any manner, and selection of the parameter that specifies a command shape is not limited to the above method.

As described above, in the command generation method to be conducted by the position-command generation unit 11 according to the first embodiment, seven position command parameters are used to specify the command shape. The conventional techniques often employ the method to specify a command shape by using two parameters, that is, an acceleration and a velocity. As compared to this conventional method, the degree of freedom for the adjustment in the first embodiment is increased. Thus, assuming that a position command parameter can be properly adjusted, the positioning control device 10 can achieve positioning control indicating an appropriate response even under the circumstances where the positioning control device 10 is affected by mechanical vibrations of a device on which the control target 3 is placed.

Meanwhile, in a case where an operator of the device on which the control target 3 is placed manually adjusts the seven parameters described above by a trial-and-error process, while operating this device, a relatively considerable amount of effort and time is required. Hereinafter, it is described that the positioning control device 10 includes the evaluation unit 13, the learning unit 14, and the learning-result holding unit 15, and can thereby adjust the position command parameter properly without the need for an operator's trial-and-error process.

In accordance with the operation of the evaluation unit 13 and the learning unit 14, changing of a position command parameter by the learning unit 14, positioning control with the changed position command parameter, and calculation of the evaluation value Q by the evaluation unit 13 are repeated. This repetitive operation of the evaluation unit 13 and the learning unit 14 is now described.

The learning unit 14 selects a position command parameter within the parameter range that specifies an upper-limit value and a lower-limit value of the position command parameter. A process is described in which the operation of the evaluation unit 13 and the learning unit 14 is repeated three times, and the first to third sets of position command parameters are evaluated. The first set of position command parameter is represented as a position command parameter Pr1. The second set of position command parameters is represented as a position command parameter Pr2. The third set of position command parameters is represented as a position command parameter Pr3. Each of the three sets of position command parameters has seven parameters including the first time length T1 to the seventh time length T7.

Figure 3:
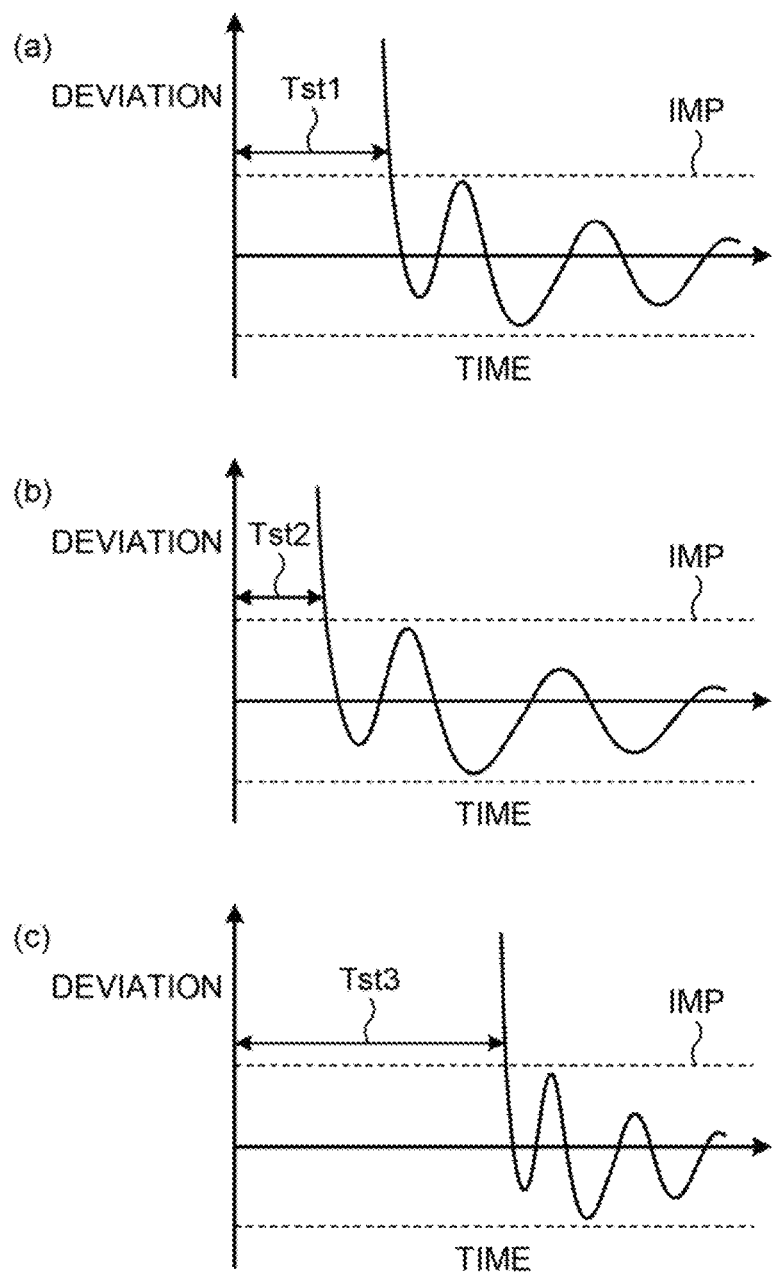
FIG. 3 are diagrams illustrating a response that is a deviation over time between a target movement distance and a detected position value when positioning control is executed using each of command shapes generated on the basis of first to third sets of position command parameters in the first embodiment.

FIG. 3 are diagrams illustrating a response that is a deviation over time between a target movement distance and a detected position value when positioning control is executed using each of the command shapes generated on the basis of the first to third sets of position command parameters in the first embodiment. FIG. 3(*a*) illustrates a response that is a deviation over time when the first set of position command parameters is used. FIG. 3(*b*) illustrates a response that is a deviation over time when the second set of position command parameters is used. FIG. 3(c) illustrates a response that is a deviation over time when the third set of position command parameters is used.

The first set of position command parameters Pr1 is output from the learning unit 14. The position-command generation unit 11 generates a position command on the basis of the first set of position command parameters Pr1. The position command generated on the basis of the first set of position command parameters Pr1 is used to execute positioning control. The evaluation unit 13 acquires a positioning time Tst1 corresponding to the first set of position command parameters Pr1 on the basis of a detected position value in this case. A time from the start of positioning control to the completion of the positioning is defined as a positioning time. At the completion of the positioning, a deviation between a target movement distance and a detected position value becomes smaller than the allowable value IMP determined in advance. An evaluation value Q1 corresponding to the first set of position command parameters Pr1 is calculated by using the following equation (26).

[Equation 26]

$$Q1 = -Tst1 \qquad (26)$$

The learning unit 14 receives the evaluation value Q1, and changes the position command parameters to the second set of position command parameters Pr2. It is allowable that when changing the position command parameters, the learning unit 14 selects the second set of position command parameters Pr2 on the basis of the result of the positioning control using the first set of position command parameters Pr1. It is also allowable that regardless of the result of the positioning control using the first set of position command parameters Pr1, the learning unit 14 selects the second set of position command parameters Pr2 as having been set in advance.

When the learning unit 14 has changed the position command parameters, a position command generated on the basis of the second set of position command parameters Pr2 is used to execute positioning control. The evaluation unit 13 acquires a positioning time Tst2 corresponding to the second set of position command parameters Pr2 on the basis of a detected position value in this case. A time from the start of positioning control to the completion of the positioning is defined as a positioning time. At the completion of the positioning, a deviation between a target movement distance and a detected position value becomes smaller than the allowable value IMP. An evaluation value Q2 corresponding to the second set of position command parameters Pr2 is calculated by using the following equation (27).

[Equation 27]

$$Q2 = -Tst2 \qquad (27)$$

The learning unit 14 receives the evaluation value Q2, and changes the position command parameters to the third set of position command parameters Pr3. Following the same procedure as that for obtaining the evaluation value Q1 and the evaluation value Q2, the evaluation unit 13 calculates an evaluation value Q3 on the basis of a positioning time Tst3 by using the following equation (28).

[Equation 28]

$$Q3 = -Tst3 \qquad (28)$$

The learning unit 14 receives the evaluation value Q3. As illustrated in FIG. 3, where a result Tst2<Tst1<Tst3 is obtained, the evaluation value Q2 is largest in the three evaluation values. Through the operation of the evaluation unit 13 and the learning unit 14 up to this stage, the learning unit 14 obtains the evaluation value Q1, the evaluation value Q2, and the evaluation value Q3 corresponding to the three sets of position command parameters Pr1, position command parameters Pr2, and position command parameters Pr3, respectively.

As described above, the evaluation unit 13 and the learning unit 14 repeat the operation to acquire the evaluation value Q corresponding to the position command parameters.

Figure 4:
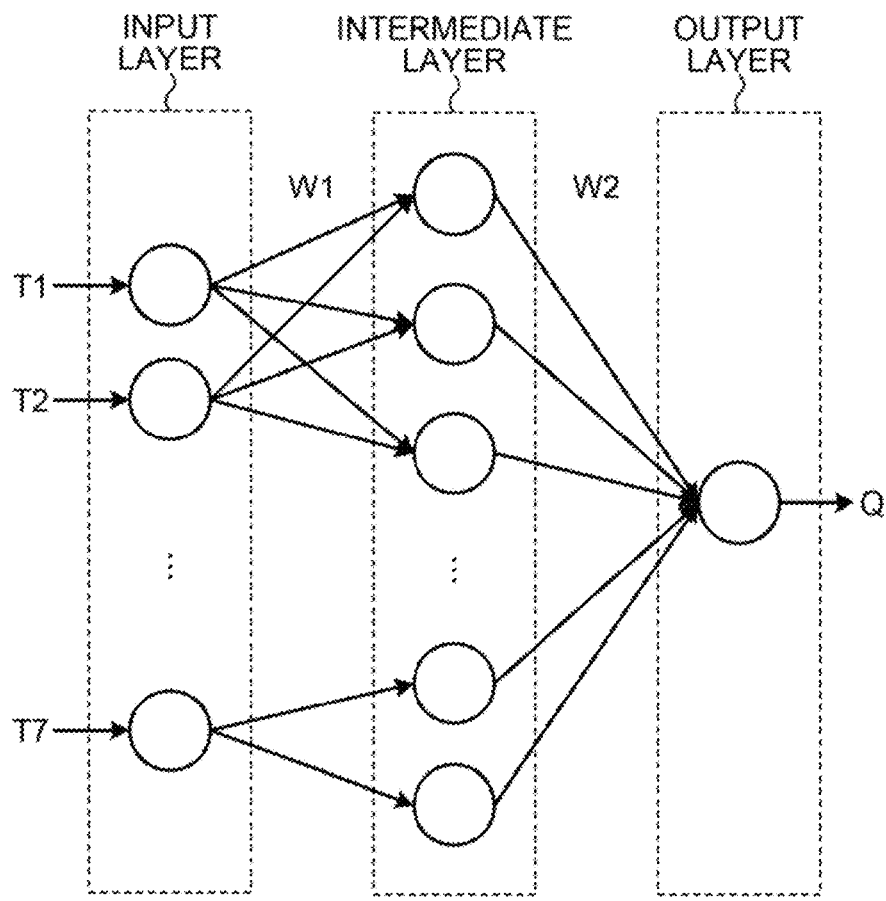
FIG. 4 is a diagram illustrating a neural network used in the first embodiment.

The learning unit 14 uses a position command parameter and the evaluation value Q corresponding to the position command parameter as learning data to perform a learning operation using a neural network. FIG. 4 is a diagram illustrating a neural network used in the first embodiment. The neural network has an input layer, an intermediate layer, and an output layer. Position command parameters are input to the input layer at the left-side end, while the evaluation value Q is output from the output layer at the right-side end. Weight coefficients from individual nodes in the input layer to individual nodes in the intermediate layer can all be independently set. However, these weight coefficients are all represented as the same weight coefficient W1 in FIG. 4. Similarly, weight coefficients from the individual nodes in the intermediate layer to an individual node in the output layer are all represented as the same weight coefficient W2.

An output value of each of the nodes in the input layer is multiplied by the weight coefficient W1. A linear combination that results from the multiplication is input to each of the nodes in the intermediate layer. An output value of each of the nodes in the intermediate layer is multiplied by the weight coefficient W2. A linear combination that results from the multiplication is input to the node in the output layer. It is allowable in each node in each layer that an output value is calculated from an input value by a non-linear function such as a sigmoid function. It is allowable in the input layer and the output layer that an output value is a linear combination of the input values.

The learning unit 14 uses the position command parameter and the evaluation value Q to calculate the weight coefficient W1 and the weight coefficient W2 in the neural network. The weight coefficient W1 and the weight coefficient W2 in the neural network can be calculated by using the back-propagation method or a gradient descent method. However, the method for calculating the weight coefficient W1 and the weight coefficient W2 is not limited to the method described above, but may be any calculation method as long as a weight coefficient in the neural network can be obtained.

When the weight coefficient in the neural network is determined, this means that a relational expression between the position command parameter and the evaluation value Q is obtained. While the example has been described above in which leaning is performed using the neural network of three layers, learning using a neural network is not limited to the example described above.

Through the operation of the evaluation unit 13 and the learning unit 14 up to this stage, a relational expression is obtained as a learning result by using the neural network.

Next, the learning-result holding unit 15 is further described. When a relational expression is obtained by using the neural network through the operation of the evaluation unit 13 and the learning unit 14 as described above, this means that a function to which the position command parameter is input and from which the evaluation value Q is output is obtained as a learning result. Even when positioning control is not executed for a newly-set position command parameter, use of this learning result still makes it possible to obtain the evaluation value Q corresponding to the newly-set position command parameter.

The learning-result holding unit 15 obtains a position command parameter at which the evaluation value Q is maximized by numerical calculation on the basis of the learning result, that is, a relational expression between the position command parameter and the evaluation value Q. At this time, the learning-result holding unit 15 uses an optimization algorism such as grid search, random search, or the Newton's method.

As described above, a relation between a command parameter and an evaluation value can be learned through the operation of the evaluation unit 13 and the learning unit 14. In addition, in accordance with the operation of the learning-result holding unit 15, using a learning result makes it possible to find an excellent position command parameter at which the evaluation value Q is maximized. Even though positioning control is not executed, the evaluation value Q corresponding to the position command parameter can still be acquired by using this learning result. Thus, even when the positioning control device 10 does not always execute positioning control using an excellent parameter, it is still possible to find an excellent parameter. Accordingly, the positioning control device 10 can properly adjust the position command parameter without the need for an operator's trial-and-error process.

Next, the parameter-range setting unit 16 is further described. As described above, the learning-result holding unit 15 obtains a position command parameter at which the evaluation value Q is maximized on the basis of a learning result, and defines the obtained position command parameter as an excellent parameter. The learning-result holding unit 15 holds therein the excellent parameter along with the target movement distance D indicated by the information included in the running condition 17. In a case where learning is performed under a plurality of different running conditions, the learning-result holding unit 15 holds therein a plurality of excellent parameters corresponding to a plurality of target movement distances D.

Figure 5:
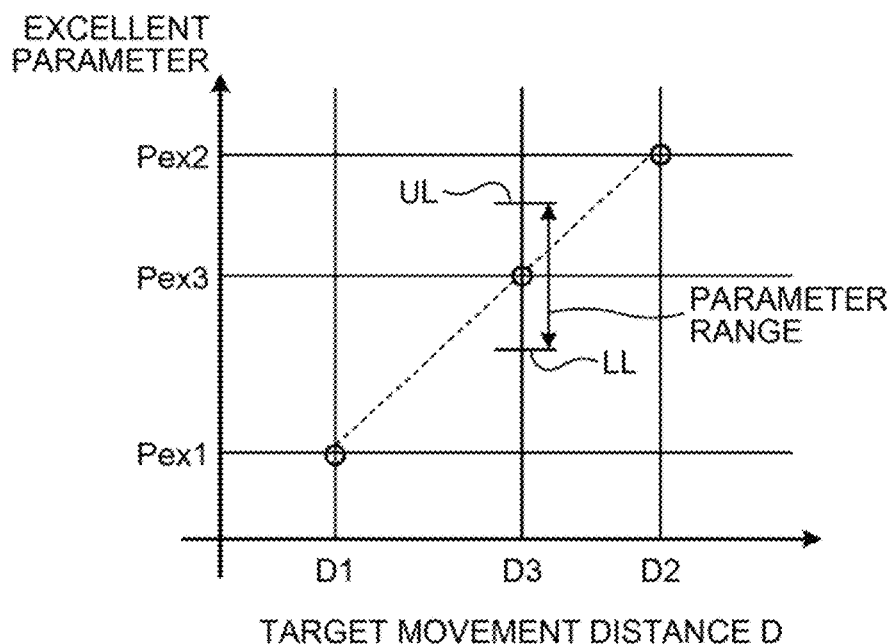
FIG. 5 is a graph illustrating a relation between the target movement distance and an excellent parameter according to the first embodiment.

The parameter-range setting unit 16 sets a parameter range on the basis of the running condition 17 and the learning result held in the learning-result holding unit 15. Next, a method for setting the parameter range by the parameter-range setting unit 16 is described with reference to FIG. 5. FIG. 5 is a graph illustrating a relation between the target movement distance D and an excellent parameter according to the first embodiment. In FIG. 5, the excellent parameter is expressed as a linear function with respect to the target movement distance D.

It is assumed that learning of a target movement distance D1 and a target movement distance D2 has already been performed, and an excellent parameter Pex1 corresponding to the target movement distance D1, and an excellent parameter Pex2 corresponding to the target movement distance D2 have been found and held in the learning-result holding unit 15. Under this condition, it is assumed that learning of a target movement distance D3 that is different from the target movement distances D1 and D2 is performed. The learning-result holding unit 15 performs interpolation calculation using the following equation (29) to estimate an excellent parameter Pex3 corresponding to the target movement distance D3.

[Equation 29]

$$Pex3 = Pex1 + \frac{D3 - D1}{D2 - D1}(Pex2 - Pex1) \quad (29)$$

As expressed by the equation (29), the learning-result holding unit 15 performs linear interpolation using two previous learning results as an interpolation method to estimate the excellent parameters Pex3. However, it is allowable that instead of performing linear interpolation, the learning-result holding unit 15 estimates the excellent parameters Pex3 by a method using spline interpolation or Lagrange's interpolation.

The parameter-range setting unit 16 uses the estimated excellent parameters Pex3 to calculate an upper-limit value UL and a lower-limit value LL of the parameter range by using the following equation (30) or equation (31).

[Equation 30]

$$UL = 1.5 \times Pex3 \quad (30)$$

[Equation 31]

$$LL = 0.5 \times Pex3 \quad (31)$$

The above method for calculating the upper-limit value UL and the lower-limit value LL is merely an example of the calculation method of the upper-limit value UL and the lower-limit value LL. The method for calculating the upper-limit value UL and the lower-limit value LL is not limited to the above calculation method, but may be any method as long as a value larger than the estimated excellent parameter Pex3 is calculated as the upper-limit value UL, while a value smaller than the excellent parameter Pex3 is calculated as the lower-limit value LL.

The parameter-range setting unit 16 changes the parameter range by setting the upper-limit value UL and the lower-limit value LL obtained by the calculation as an upper-limit value and a lower-limit value of a newly-set parameter range.

As described above, since the parameter-range setting unit 16 calculates the upper-limit value UL and the lower-limit value LL of the parameter range on the basis of a learning result, the positioning control device 10 does not need a trial-and-error process by an operator of the device to change the parameter range.

When there is a change in the target movement distance D, the parameter-range setting unit 16 can set values nearby an estimated value of an excellent parameter corresponding to the changed target movement distance D as a parameter range, and is thus capable of narrowing the parameter range. Accordingly, the parameter-range setting unit 16 is capable of finding an excellent parameter with a reduced number of trials for positioning control. Therefore, the positioning control device 10 is capable of adjusting a command shape of a position command in a shorter time.

In the first embodiment, the example is illustrated in which the number of position command parameters that specify a command shape is seven. The method according to the first embodiment is still applicable to a case where a higher degree of design freedom is given by more than seven parameters. The method according to the first embodiment is still applicable to a case with even a lower degree of design freedom.

In the first embodiment, a neural network is used to establish a relational expression between the position command parameter and the evaluation value Q. However, the neural network may not be used as long as the relation between the position command parameter and the evaluation value Q can be obtained. For example, it is allowable to obtain a relation between the position command parameter and the evaluation value Q by using a simple function such as a second-order polynomial. It is also allowable to obtain a relation between the position command parameter and the evaluation value Q by using a stochastic model such as the Gaussian process model.

In the first embodiment, it has been described that the search range of a command shape can be properly set when there is a change in the target movement distance. However, the effects produced by the parameter-range setting unit 16 are not limited to being obtained only when there is a change in the target movement distance. For example, in a case where there is a change in the characteristics of mechanical vibrations of a device due to the influence of heat generated by continuous running of the device or the influence of degradation of the device over time, the positioning control device 10 can search for position command parameters nearby an excellent parameter found by the previous learning. Thus, the positioning control device 10 is capable of finding an appropriate position command parameter corresponding to the change in the mechanical characteristics with a reduced number of trials for positioning control.

Even when there is a change in the target movement distance, the positioning control device 10 according to the first embodiment can still properly set the search range of a command shape, and can consequently adjust the command shape efficiently.

In view of the above, when searching for an appropriate command shape to speed up positioning control, the positioning control device 10 according to the first embodiment can properly set the search range of the command shape, and can consequently adjust the command shape efficiently.

It is allowable that the position-command generation unit 11 sets the shape of a signal of a position command such that a time exists during which an acceleration command signal is a constant value larger than zero or a constant value smaller than zero. The acceleration command signal is obtained by the second-order differential of the signal of the position command. It is also allowable that the position-command generation unit 11 sets the shape of a signal of a position command such that a time exists during which a signal of the jerk is a constant value larger than zero or a constant value smaller than zero. The signal of the jerk is obtained by the third-order differential of the signal of the position command. It is allowable that the position-command generation unit 11 includes information indicating the time, during which the signal of the jerk is a constant value larger than zero or a constant value smaller than zero, in a position command parameter. It is also allowable that the position-command generation unit 11 includes information indicating the magnitude of the signal of the jerk for the time, during which the signal of the jerk is a constant value larger than zero or a constant value smaller than zero, in a position command parameter.

In the first embodiment, the learning unit 14 receives input of a position command parameter and obtains a function to calculate an estimated value of the evaluation value Q as a learning result. In addition to this, it is allowable that a combination of a position command parameter used for positioning control and the evaluation value Q obtained by executing the positioning control is included in the learning result. This enables the learning-result holding unit 15 to select an excellent parameter also from the combination of the position command parameter and the evaluation value Q obtained by executing the positioning control.

In the positioning control device 10 according to the first embodiment, a position command parameter obtained by learning in the learning unit 14 is set in the position-command generation unit (learner) 11, and the position-command generation unit (learner) 11 generates a position command, so that the positioning control device 10 can achieve high-speed positioning control.

Second Embodiment

Even when there is a change in the target movement distance for positioning control, the positioning control device 10 according to the first embodiment still properly sets the search range of a command shape, and efficiently searches for the command shape. In a second embodiment, descriptions are made on a positioning control device that can still properly set the search range of a command shape even when there is a change in a target stopping position for positioning control.

Figure 6:
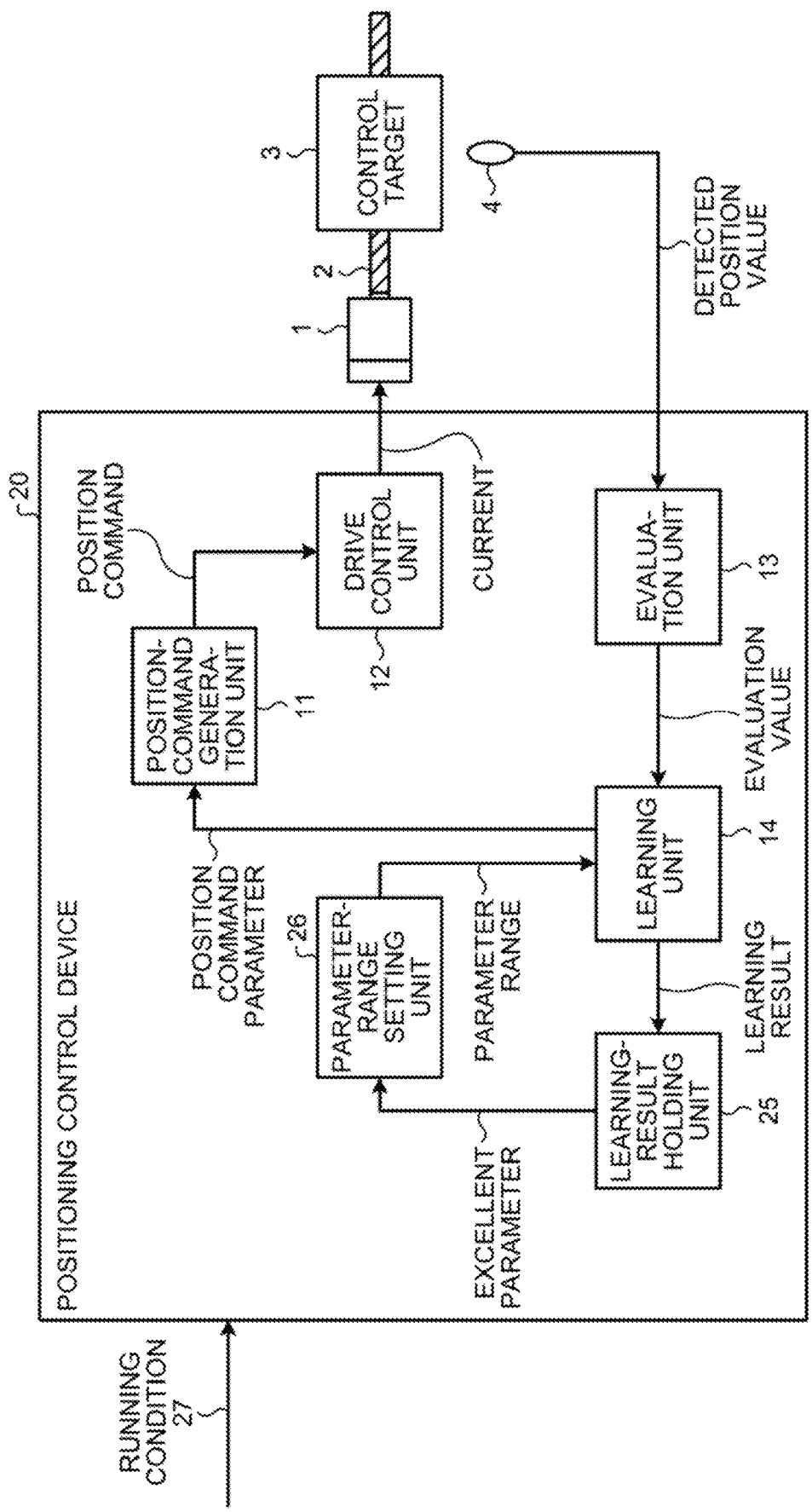
FIG. 6 is a diagram illustrating a configuration of a positioning control device according to a second embodiment.

FIG. 6 is a diagram illustrating a configuration of a positioning control device 20 according to the second embodiment. As illustrated in FIG. 6, the positioning control device 20 is connected to the motor 1 and the position detector 4. The positioning control device 20 is given a running condition 27 from outside of the positioning control device 20. The running condition 27 includes information on a target movement distance and information on a target stopping position both for driving the motor 1. The positioning control device 20 executes positioning control so as to satisfy the running condition 27.

The positioning control device 20 includes the position-command generation unit 11, the drive control unit 12, the evaluation unit 13, the learning unit 14, a learning-result holding unit 25, and a parameter-range setting unit 26. In the second embodiment, detailed descriptions of the constituent elements explained in the first embodiment are omitted.

The learning-result holding unit 25 receives input of a learning result from the learning unit 14, and holds therein the learning result in association with a target stopping position. The learning-result holding unit 25 obtains a position command parameter at which the evaluation value is maximized by numerical calculation on the basis of the learning result that is a relational expression between the position command parameter and the evaluation value. For example, the learning-result holding unit 25 obtains a position command parameter at which the evaluation value is maximized by using an optimization algorism such as grid search, random search, or the Newton's method. The learning-result holding unit 25 obtains and holds therein the position command parameter at which the evaluation value is maximized as an excellent parameter (second excellent parameter), and outputs the excellent parameter in association with the target stopping position.

It is allowable that instead of defining a position command parameter at which the evaluation value is maximized as an excellent parameter, the learning-result holding unit 25 may define a position command parameter indicating appropriate positioning control as an excellent parameter.

The parameter-range setting unit 26 determines a parameter range that specifies an upper-limit value and a lower-limit value of the position command parameter on the basis of the excellent parameter and a target stopping position indicated by the information included in the running condition 27, and then outputs the determined parameter range. When there is a change in the target stopping position indicated by the information included in the running condition 27, the parameter-range setting unit 26 performs interpolation calculation on the basis of the target stopping position at the time when learning has been performed previously to estimate an excellent parameter at an interpolating point corresponding to the changed target stopping position. In addition, the parameter-range setting unit 26 sets the parameter range by defining a value smaller than the estimated excellent parameter at the interpolating point as a lower limit of the parameter range, and by defining a value larger than the estimated excellent parameter at the interpolating point as an upper limit of the parameter range.

Specifically, the parameter-range setting unit 26 creates a linear function expression indicating a relation between a target stopping position and an excellent parameter. When there is a change in the target stopping position, the parameter-range setting unit 26 obtains an estimated value of an excellent parameter for the changed target stopping position on the basis of the created linear function expression. The parameter-range setting unit 26 sets a value larger than the estimated value of an excellent parameter as an upper-limit value, while setting a value smaller than the estimated value of an excellent parameter as a lower-limit value. In a case where there are a plurality of position command parameters, the parameter-range setting unit 26 sets an upper-limit value and a lower-limit value for each of the position command parameters.

As long as the parameter-range setting unit 26 can obtain an estimated value of an excellent parameter corresponding to the changed target stopping position, it is allowable that the parameter-range setting unit 26 performs the calculation on the basis of another rule without creating a linear function expression indicating a relation between the excellent parameter and the target stopping position.

The positioning control device 20 operates in the same manner as the positioning control device 10 according to the first embodiment, except that the parameter-range setting unit 26 determines a parameter range on the basis of the target stopping position. Thus, the effects obtained by the operation of the evaluation unit 13, the learning unit 14, and the learning-result holding unit 25 are the same as those described in the first embodiment.

The learning-result holding unit 25 obtains a position command parameter at which the evaluation value Q is maximized on the basis of a learning result in the learning unit 14, and defines the obtained position command parameter as an excellent parameter. The learning-result holding unit 25 holds therein the excellent parameter along with the target stopping position indicated by the information included in the running condition 27. In a case where learning is performed under a plurality of different running conditions, the learning-result holding unit 25 holds therein a plurality of excellent parameters corresponding to a plurality of target stopping positions SP.

Figure 7:
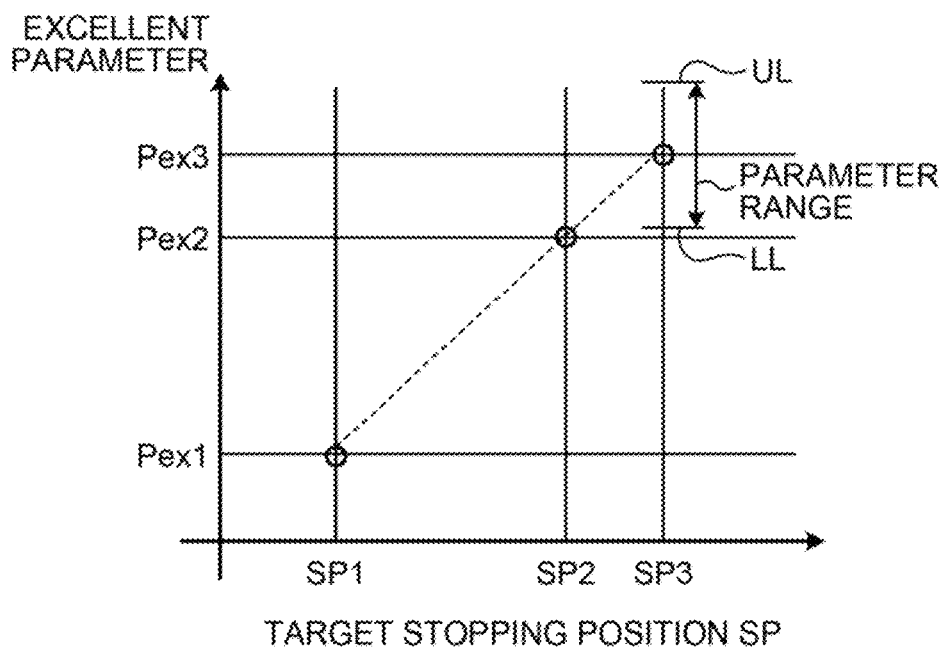
FIG. 7 is a graph illustrating a relation between a target stopping position and an excellent parameter according to the second embodiment.

The parameter-range setting unit 26 sets a parameter range on the basis of the running condition 27 and the learning result held in the learning-result holding unit 25. A method for setting the parameter range at this time is described with reference to FIG. 7. FIG. 7 is a graph illustrating a relation between the target stopping position SP and an excellent parameter according to the second embodiment. In FIG. 7, the excellent parameter is expressed as a linear function with respect to the target stopping position SP.

It is assumed that learning of a target stopping position SP1 and a target stopping position SP2 has already been performed, and an excellent parameter Pex1 corresponding to the target stopping position SP1, and an excellent parameter Pex2 corresponding to the target stopping position SP2 have been found and held in the learning-result holding unit 25. Under this condition, it is assumed that learning of a target stopping position SP3 that is different from the target stopping positions SP1 and SP2 is performed. An excellent parameter Pex3 corresponding to the target stopping position SP3 is estimated by using the following equation (32).

[Equation 32]

$$Pex3 = Pex1 + \frac{SP3 - SP1}{SP2 - SP1}(Pex2 - Pex1) \tag{32}$$

As expressed by the equation (32), the learning-result holding unit 25 performs linear interpolation using two previous learning results as an interpolation method to estimate the excellent parameters Pex3. However, it is allowable that instead of performing linear interpolation, the learning-result holding unit 25 estimates the excellent parameters Pex3 by a method using spline interpolation or Lagrange's interpolation.

The parameter-range setting unit 26 uses the estimated excellent parameters Pex3 to calculate an upper-limit value UL and a lower-limit value LL of the parameter range by using the following equation (33) or equation (34).

[Equation 33]

$$UL = 1.5 \times Pex3 \tag{33}$$

[Equation 34]

$$LL = 0.5 \times Pex3 \tag{34}$$

The above method for calculating the upper-limit value UL and the lower-limit value LL is merely an example of the calculation method of the upper-limit value UL and the lower-limit value LL. The method for calculating the upper-limit value UL and the lower-limit value LL is not limited to the above calculation method, but may be any method as long as a value larger than the estimated excellent parameter Pex3 is calculated as the upper-limit value UL, while a value smaller than the excellent parameter Pex3 is calculated as the lower-limit value LL.

The parameter-range setting unit 26 changes the parameter range by setting the upper-limit value UL and the lower-limit value LL obtained by the calculation as an upper-limit value and a lower-limit value of a newly-set parameter range.

Since the parameter-range setting unit 26 calculates the upper-limit value UL and the lower-limit value LL of the parameter range on the basis of a learning result, the positioning control device 20 does not need a trial-and-error process by an operator of the device for changing the parameter range.

When there is a change in the target stopping position SP, the positioning control device 20 can set values nearby an estimated value of an excellent parameter corresponding to the changed target stopping position as a parameter range, and is thus capable of narrowing the parameter range. Accordingly, the positioning control device 20 is capable of finding an excellent parameter with a reduced number of trials for positioning control. Therefore, the positioning control device 20 is capable of adjusting a command shape of a position command in a shorter time.

In positioning control to be executed on a device with a linear motion mechanism such as a ball screw mechanism or a linear mechanism, as the control target 3 stops at a different position, mechanical vibrations generated due to low rigidity of the device indicate different characteristics. For this reason, despite an equal target movement amount, when there is a change in the target stopping position, high-speed positioning control may not be executed due to the influence of mechanical vibrations in the conventional technique.

Even when there is a change in the target stopping position, the positioning control device 20 according to the second embodiment can still properly set the search range of a command shape, and can consequently adjust the command shape efficiently.

The parameter-range setting unit 26 according to the second embodiment establishes a relational expression of an excellent parameter relative to the target stopping position for calculation of a parameter range. However, it is allowable that the parameter-range setting unit 26 establishes a relational expression of an excellent parameter relative to both the target stopping position and the target movement distance. In this case, even when there is a change in both the target stopping position and the target movement distance, the parameter-range setting unit 26 can still estimate an excellent parameter for both the target stopping position and the target movement distance, and can properly set the parameter range.

In view of the above, when searching for an appropriate command shape to speed up positioning control and adjusting the command shape, the positioning control device 20 according to the second embodiment can properly set the search range of the command shape, and can consequently adjust the command shape efficiently.

Third Embodiment

The positioning control device 10 according to the first embodiment searches for a command shape by which the positioning time is minimized. In a third embodiment, descriptions are made on a positioning control device that can still properly set the search range of a command shape even when an evaluation value is calculated by a different method.

Figure 8:
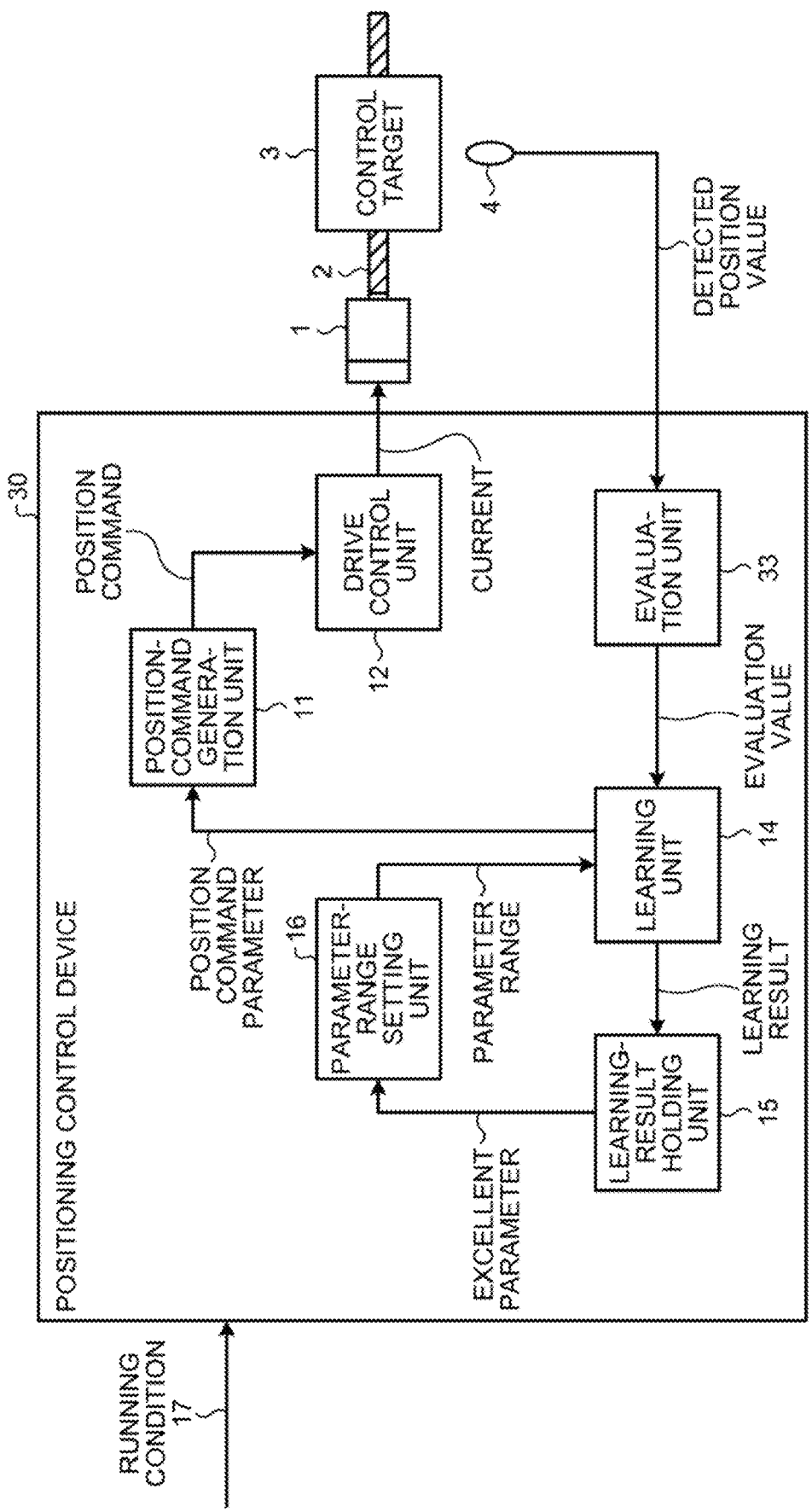
FIG. 8 is a diagram illustrating a configuration of a positioning control device according to a third embodiment.

FIG. 8 is a diagram illustrating a configuration of a positioning control device 30 according to the third embodiment. As illustrated in FIG. 8, the positioning control device 30 is connected to the motor 1 and the position detector 4. The positioning control device 30 is given the running condition 17 from outside of the positioning control device 30. The running condition 17 includes information indicating a target movement distance for driving the motor 1. The positioning control device 30 executes positioning control so as to satisfy the running condition 17.

The positioning control device 30 includes the position-command generation unit 11, the drive control unit 12, an evaluation unit 33, the learning unit 14, the learning-result holding unit 15, and the parameter-range setting unit 16. In the third embodiment, detailed descriptions of the constituent elements explained in the first embodiment are omitted.

The evaluation unit 33 receives input of a detected position value, calculates the evaluation value Q for evaluating whether positioning control by the drive control unit 12 is executed properly by using a method described later, and then outputs the calculated evaluation value Q. The drive control unit 12 operates on the basis of a position command. The position command is calculated on the basis of a position command parameter. Therefore, the evaluation value Q calculated by the evaluation unit 33 depends on the value of the position command parameter. That is, the evaluation value Q calculated by the evaluation unit 33 is regarded as an indicator for evaluating the position command parameter.

A specific method for calculating the evaluation value Q is now described. A time from the start of positioning control to the completion of the positioning is defined as a positioning time. At the completion of the positioning, a deviation between a target movement distance and a detected position value becomes smaller than the allowable value IMP. The evaluation value Q is set to indicate a larger value as the value of the positioning time Tst is smaller. In the third embodiment, a deviation of residual vibrations after the deviation becomes smaller than the allowable value IMP is also evaluated.

Figure 9:
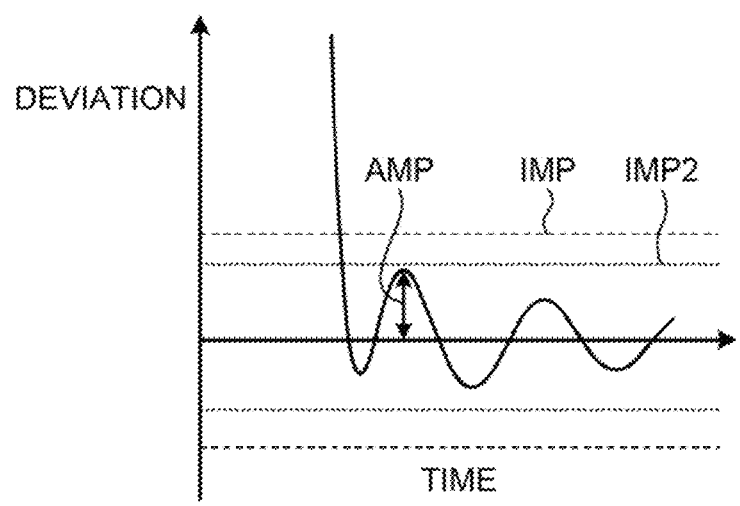
FIG. 9 is a diagram illustrating a response that is a deviation over time in the third embodiment.

FIG. 9 is a diagram illustrating a response that is a deviation over time in the third embodiment. As illustrated in FIG. 9, a maximum value of the deviation of residual vibrations after the deviation becomes smaller than a second allowable value IMP2 determined in advance is defined as a residual vibration amplitude AMP. The range of the second allowable value IMP2 is narrower than the range of the allowable value IMP. When the residual vibration amplitude AMP is larger than the second allowable value IMP2, the evaluation unit 33 imposes a penalty on the evaluation value Q. That is, when the residual vibration amplitude AMP that is an amplitude of the residual vibrations generated at the position of the motor 1 or the control target 3 is equal to or larger than a value determined in advance, the evaluation unit 33 calculates the evaluation value Q such that the evaluation value Q is decreased. Specifically, the evaluation unit 33 uses the following equation (35) to calculate the evaluation value Q.

[Equation 35]

$$Q = -Tst - \gamma \times \max(0, AMP - IMP2) \qquad (35)$$

$\gamma$ is a positive value. $\max(x1, x2)$ is a function to output the larger one of the two arguments $x1$ and $x2$.

In accordance with the equation (35), as the value of the positioning time Tst is smaller, the evaluation value Q becomes larger by the first term on the right side. When the residual vibration amplitude AMP is larger than the second allowable value IMP2, the evaluation value Q becomes smaller by the second term on the right side. That is, when the value of the positioning time Tst is smaller, and the residual vibration amplitude AMP is smaller than the second allowable value IMP2, the evaluation value Q becomes larger. A position command parameter obtained at this time is regarded as an appropriate position command parameter. However, the evaluation value Q may be calculated without using the equation (35) as long as positioning control can be evaluated by the evaluation value Q.

The positioning control device 30 operates in the same manner as the positioning control device 10 according to the first embodiment, except that the evaluation unit 33 uses the residual vibration amplitude AMP to calculate the evaluation value Q. Thus, the effects obtained on the basis of the operation of the learning unit 14, the learning-result holding unit 15, and the parameter-range setting unit 16 are the same as those described in the first embodiment.

Due to the operation of the evaluation unit 33, it is possible for the positioning control device 30 to achieve positioning control so as to reduce the positioning time while decreasing the residual vibration amplitude AMP to a value smaller than the second allowable value IMP2.

FIG. 10 are diagrams illustrating a response that is a deviation over time in the third embodiment when the fourth set of position command parameters and the fifth set of position command parameters are used. The number "4" of the fourth set, and the number "5" of the fifth set are given merely for the purpose of distinguishing the fourth set and the fifth set of position command parameters from the first to third sets of position command parameters in the first embodiment. These numbers do not have any meaning other than distinguishing the sets. FIG. 10(a) illustrates a response that is a deviation over time when the fourth set of position command parameters is used. FIG. 10(b) illustrates a response that is a deviation over time when the fifth set of position command parameters is used.

As illustrated in FIG. 10, Tst4<Tst5 is derived from the comparison between a positioning time Tst4 when the fourth set of position command parameters is used and a positioning time Tst5 when the fifth set of position command parameters is used. That is, the positioning time Tst4 when the fourth set of position command parameters is used is shorter than the positioning time Tst5 when the fifth set of position command parameters is used. However, since a residual vibration amplitude AMP4 when the fourth set of position command parameters is used is larger than the second allowable value IMP2, a penalty is imposed on the evaluation value Q. FIG. 10(b) illustrates a residual vibration amplitude AMP5 when the fifth set of position command parameters is used.

At this time, γ is set such that the following equation (36) holds, and thereby a larger value can be given to an evaluation value Q5 for the fifth set of position command parameters than to an evaluation value Q4 for the fourth set of position command parameters.

[Equation 36]

$$-Tst4-\gamma \times (ANIP4-IMP2) < -Tst5 \quad (36)$$

The positioning control device 30 operates in the same manner as the positioning control device 10 according to the first embodiment, except for the method for calculating the evaluation value Q. That is, the positioning control device 30 can adjust a command shape of a position command such that the evaluation value Q is maximized.

Due to the operation of the evaluation unit 33, the positioning control device 30 is capable of adjusting a command shape that maximizes the evaluation value Q within a range where the residual vibration amplitude AMP satisfies the range of the second allowable value IMP2.

When there is a change in the target movement distance, the positioning control device 30 can set values nearby an estimated value of an excellent parameter (first excellent parameter) corresponding to the changed target movement distance as a parameter range, and is thus capable of narrowing the parameter range. Accordingly, the positioning control device 30 is capable of finding an excellent parameter with a reduced number of trials for positioning control.

In an electronic-component installation device, installation of electronic components is carried out after completion of positioning control. At this time, if the vibration amplitude is large after completion of the positioning, electronic components may be installed with less precision. That is, in addition to a shorter positioning time, a smaller residual vibration amplitude after completion of the positioning is required.

The positioning control device 30 according to the third embodiment is capable of searching for an appropriate command shape while reducing the residual vibration amplitude after completion of the positioning to fall within the range of the second allowable value.

The evaluation unit 33 according to the third embodiment imposes a penalty when the maximum value of the amplitude of a deviation after completion of the positioning is larger than the second allowable value. However, the manner of imposing a penalty is not limited to the method described above. For example, it is allowable that the evaluation unit 33 imposes a penalty on a plurality of values of the residual vibration amplitude when the residual vibration amplitude becomes a relative maximum. It is also allowable that the evaluation unit 33 adds a time condition to the parameters such that the residual vibration amplitude is evaluated only for a given time after completion of the positioning.

In view of the above, when searching for an appropriate command shape to speed up positioning control, the positioning control device 30 according to the third embodiment can properly set the search range of the command shape, and can consequently adjust the command shape efficiently.

Figure 11:
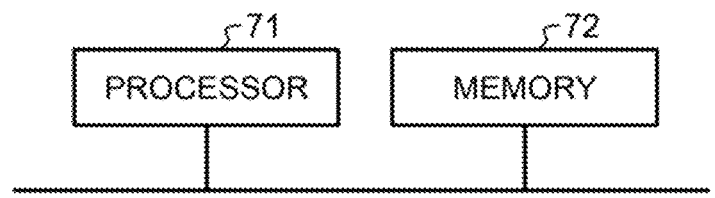
FIG. 11 is a diagram illustrating a processor in a case where some or all of functions of a position-command generation unit, a drive control unit, an evaluation unit, a learning unit, a learning-result holding unit, and a parameter-range setting unit that are included in the positioning control device according to the first embodiment are implemented by the processor.

FIG. 11 is a diagram illustrating a processor 71 in a case where some or all of the functions of the position-command generation unit 11, the drive control unit 12, the evaluation unit 13, the learning unit 14, the learning-result holding unit 15, and the parameter-range setting unit 16 that are included in the positioning control device 10 according to the first embodiment are implemented by the processor 71. That is, it is allowable that some or all of the functions of the position-command generation unit 11, the drive control unit 12, the evaluation unit 13, the learning unit 14, the learning-result holding unit 15, and the parameter-range setting unit 16 are implemented by the processor 71 that executes programs stored in a memory 72.

The processor 71 is a Central Processing Unit (CPU), a processing device, an arithmetic device, a microprocessor, or a Digital Signal Processor (DSP). FIG. 11 also illustrates the memory 72.

In a case where some or all of the functions of the position-command generation unit 11, the drive control unit 12, the evaluation unit 13, the learning unit 14, the learning-result holding unit 15, and the parameter-range setting unit 16 are implemented by the processor 71, the some or all of the functions are implemented by the processor 71 and by software, firmware, or a combination of the software and the firmware. The software or the firmware is described as programs and stored in the memory 72. The processor 71 reads and executes the programs stored in the memory 72 to thereby implement some or all of the functions of the position-command generation unit 11, the drive control unit 12, the evaluation unit 13, the learning unit 14, the learning-result holding unit 15, and the parameter-range setting unit 16.

In a case where some or all of the functions of the position-command generation unit 11, the drive control unit 12, the evaluation unit 13, the learning unit 14, the learning-result holding unit 15, and the parameter-range setting unit 16 are implemented by the processor 71, the positioning control device 10 includes the memory 72 that stores therein programs with which steps executed by some or all of the position-command generation unit 11, the drive control unit 12, the evaluation unit 13, the learning unit 14, the learning-result holding unit 15, and the parameter-range setting unit 16 are executed as a result. The programs stored in the memory 72 are also regarded as causing a computer to execute the procedure or the method to be conducted by some or all of the position-command generation unit 11, the drive control unit 12, the evaluation unit 13, the learning unit 14, the learning-result holding unit 15, and the parameter-range setting unit 16.

The memory 72 is a nonvolatile or volatile semiconductor memory such as a Random Access Memory (RAM), a Read Only Memory (ROM), a flash memory, an Erasable Programmable Read Only Memory (EPROM), or an Electrically Erasable Programmable Read-Only Memory (EEPROM) (registered trademark); a magnetic disk; a flexible disk; an optical disk; a compact disk; a mini disk; a Digital Versatile Disk (DVD); or the like.

Figure 12:
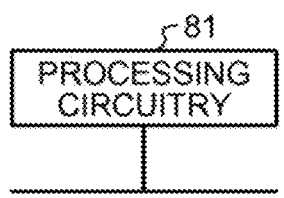
FIG. 12 is a diagram illustrating a processing circuitry in a case where some or all of the position-command generation unit, the drive control unit, the evaluation unit, the learning unit, the learning-result holding unit, and the parameter-range setting unit that are included in the positioning control device according to the first embodiment are implemented by the processing circuitry.

FIG. 12 is a diagram illustrating a processing circuitry 81 in a case where some or all of the position-command generation unit 11, the drive control unit 12, the evaluation unit 13, the learning unit 14, the learning-result holding unit 15, and the parameter-range setting unit 16 that are included in the positioning control device 10 according to the first embodiment are implemented by the processing circuitry 81. That is, some or all of the position-command generation unit 11, the drive control unit 12, the evaluation unit 13, the learning unit 14, the learning-result holding unit 15, and the parameter-range setting unit 16 may be implemented by the processing circuitry 81.

The processing circuitry 81 is dedicated hardware. The processing circuitry 81 is, for example, a single circuit, a composite circuit, a programmed processor, a parallel-programmed processor, an Application Specific Integrated Circuit (ASIC), an Field-Programmable Gate Array (FPGA), or a combination thereof.

It is allowable that some of the position-command generation unit 11, the drive control unit 12, the evaluation unit 13, the learning unit 14, the learning-result holding unit 15, and the parameter-range setting unit 16 are dedicated hardware separate from the rest.

As for a plurality of functions of the position-command generation unit 11, the drive control unit 12, the evaluation unit 13, the learning unit 14, the learning-result holding unit 15, and the parameter-range setting unit 16, it is allowable that some of the functions are implemented in software or firmware, while the other functions are implemented in dedicated hardware. In this manner, the functions of the position-command generation unit 11, the drive control unit 12, the evaluation unit 13, the learning unit 14, the learning-result holding unit 15, and the parameter-range setting unit 16 can be implemented in hardware, software, firmware, or a combination thereof.

It is allowable that some or all of the functions of the position-command generation unit 11, the drive control unit 12, the evaluation unit 13, the learning unit 14, the learning-result holding unit 25, and the parameter-range setting unit 26 that are included in the positioning control device 20 according to the second embodiment are implemented by a processor equivalent to the processor 71. In a case where the some or all of the functions are implemented by the processor, the positioning control device 20 includes a memory that stores therein programs with which steps executed by some or all of the position-command generation unit 11, the drive control unit 12, the evaluation unit 13, the learning unit 14, the learning-result holding unit 25, and the parameter-range setting unit 26 are executed as a result. The memory is a memory equivalent to the memory 72.

Some or all of the functions of the position-command generation unit 11, the drive control unit 12, the evaluation unit 13, the learning unit 14, the learning-result holding unit 25, and the parameter-range setting unit 26 that are included in the positioning control device 20 according to the second embodiment may be implemented by a processing circuitry equivalent to the processing circuitry 81.

It is allowable that some or all of the functions of the position-command generation unit 11, the drive control unit 12, the evaluation unit 33, the learning unit 14, the learning-result holding unit 15, and the parameter-range setting unit 16 that are included in the positioning control device 30 according to the third embodiment are implemented by a processor equivalent to the processor 71. In a case where the some or all of the functions are implemented by the processor, the positioning control device 30 includes a memory that stores therein programs with which steps executed by some or all of the position-command generation unit 11, the drive control unit 12, the evaluation unit 33, the learning unit 14, the learning-result holding unit 15, and the parameter-range setting unit 16 are executed as a result. The memory is a memory equivalent to the memory 72.

Some or all of the functions of the position-command generation unit 11, the drive control unit 12, the evaluation unit 33, the learning unit 14, the learning-result holding unit 15, and the parameter-range setting unit 16 that are included in the positioning control device 30 according to the third embodiment may be implemented by a processing circuitry equivalent to the processing circuitry 81.

Fourth Embodiment

Figure 13:
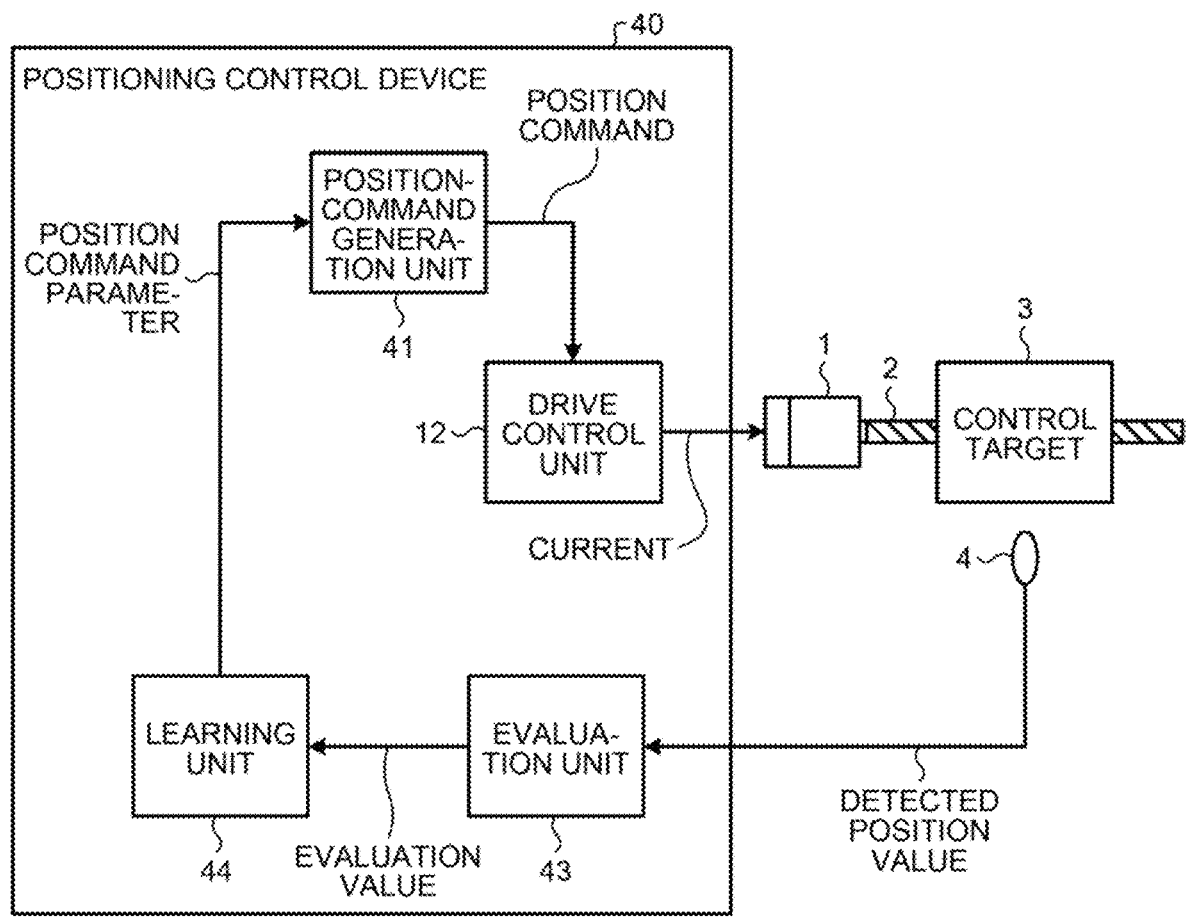
FIG. 13 is a diagram illustrating a configuration of a positioning control device according to a fourth embodiment.

FIG. 13 is a diagram illustrating a configuration of a positioning control device 40 according to a fourth embodiment. In the fourth embodiment, detailed descriptions of the constituent elements explained in the first embodiment are omitted. The positioning control device 40 includes a position-command generation unit 41 that generates a position command for moving the control target 3 by a target movement distance by driving the motor 1 on the basis of a position command parameter that specifies the shape of the position command. The position-command generation unit 41 has a function identical to the function of the position-command generation unit 11 according to the first embodiment. The positioning control device 40 further includes the drive control unit 12 that drives the motor 1 such that the detected position value of the motor 1 or the control target 3 follows the position command generated by the position-command generation unit 41.

The position-command generation unit 41 generates and outputs a position command for the motor 1 to the drive control unit 12. The position command parameter is a parameter that specifies a command shape of the position command. The individual shapes of a position command used in the fourth embodiment, a velocity command obtained by the first-order differential of the position command, an acceleration command obtained by the second-order differential of the position command, and a jerk obtained by the first-order differential of the acceleration command are identical to the shapes illustrated in FIG. 2 in the first embodiment. In the acceleration command in FIG. 2, the trapezoidal shape in the accelerating section from the first section to the third section, and the trapezoidal shape in the decelerating section from the fifth section to the seventh section may not be congruent with each other. It is allowable that the acceleration command is set to 0 for the first time length T1 and the third time length T3 in the accelerating section such that the acceleration command has a rectangular shape. Seven parameters including the first time length T1 to the seventh time length T7 are position command parameters.

The positioning control device 40 further includes an evaluation unit 43 that calculates an evaluation value for evaluating whether positioning control by the drive control unit 12 is executed properly on the basis of the detected position value of the motor 1 or the control target 3 during execution of the positioning control on the control target 3. The evaluation unit 43 has a function identical to the function of the evaluation unit 13 according to the first embodiment. The positioning control device 40 further includes a learning unit 44 that obtains a learning result by learning a relation between a position command parameter and an evaluation value calculated by the evaluation unit 43 when positioning control is executed on the control target 3 plural times after the position command parameter is changed. The learning unit 44 has a function identical to the function of the learning unit 14 according to the first embodiment. The evaluation unit 43 and the learning unit 44 are further described below.

The evaluation unit 43 receives information indicating a detected position value from the position detector 4, which is the result of the detection by the position detector 4, calculates the evaluation value Q for evaluating whether positioning control by the drive control unit 12 is executed properly by using a method described later, and then outputs the calculated evaluation value Q. The drive control unit 12 operates on the basis of a position command. The position command is calculated on the basis of a position command parameter. Therefore, the evaluation value Q calculated by the evaluation unit 43 depends on the value of the position command parameter. That is, the evaluation value Q is regarded as an indicator for evaluating the position command parameter. In the fourth embodiment, the evaluation value Q is calculated by the same method as that in the first embodiment. As the evaluation value Q becomes larger, the position command parameter is considered to be more excellent.

The learning unit 44 receives input of the evaluation value Q, learns a relation between the position command parameter and the evaluation value Q, and obtains a learning result. Specifically, the learning unit 44 performs learning by updating a function to estimate an average value and a variance value of the evaluation value Q corresponding to the position command parameter. By performing learning, the learning unit 44 is capable of calculating and estimating an average value of the evaluation value Q corresponding to the position command parameter, and a variance value of the evaluation value Q corresponding to the position command parameter. It is allowable that the Gaussian process model is used for a function to calculate the average value and the variance value. In the manner as described above, the learning unit 44 obtains a relational expression between the position command parameter and the evaluation value Q.

The learning unit 44 selects a position command parameter for executing the next positioning control, and outputs the selected position command parameter to the position-command generation unit 41. In selecting the next position command parameter, the learning unit 44 selects a position command parameter indicating the maximum value of the sum of an average value and a variance value of the evaluation value Q on the basis of a learning result.

The learning unit 44 outputs to the position-command generation unit 41 a position command parameter at which the evaluation value Q is maximized among the evaluation values Q obtained from the evaluation unit 43 by positioning control repeated by the number of times determined in advance while changing the position command parameter.

Functions of the positioning control device 40 according to the fourth embodiment are further described below. The learning unit 44 determines a set of position command parameters, and outputs the determined position command parameters to the position-command generation unit 41. The position-command generation unit 41 calculates a position command on the basis of the input position command parameters. Similarly to the position-command generation unit 11 according to the first embodiment, the position-command generation unit 41 uses seven position command parameters to specify the command shape. The conventional techniques often employ a method to specify a command shape by using two parameters, that is, an acceleration and a velocity. As compared to this conventional method, the degree of freedom for adjustment in the fourth embodiment is increased. Thus, assuming that a position command parameter can be properly adjusted, the positioning control device 40 can achieve positioning control indicating an appropriate response even under the circumstances where the positioning control device 40 is affected by mechanical vibrations of a device on which the control target 3 is placed.

Meanwhile, in a case where an operator of the device on which the control target 3 is placed manually adjusts the seven parameters described above by a trial-and-error process, while operating this device, a relatively considerable amount of effort and time is required. Hereinafter, it is described that the positioning control device 40 includes the evaluation unit 43 and the learning unit 44, and can thereby adjust the position command parameter properly without the need for an operator's trial-and-error process.

In accordance with the operation of the evaluation unit 43 and the learning unit 44, changing of a position command parameter by the learning unit 44, positioning control with the changed position command parameter, and calculation of the evaluation value Q by the evaluation unit 43 are repeated. This repetitive operation of the evaluation unit 43 and the learning unit 44 is now described.

Figure 14:
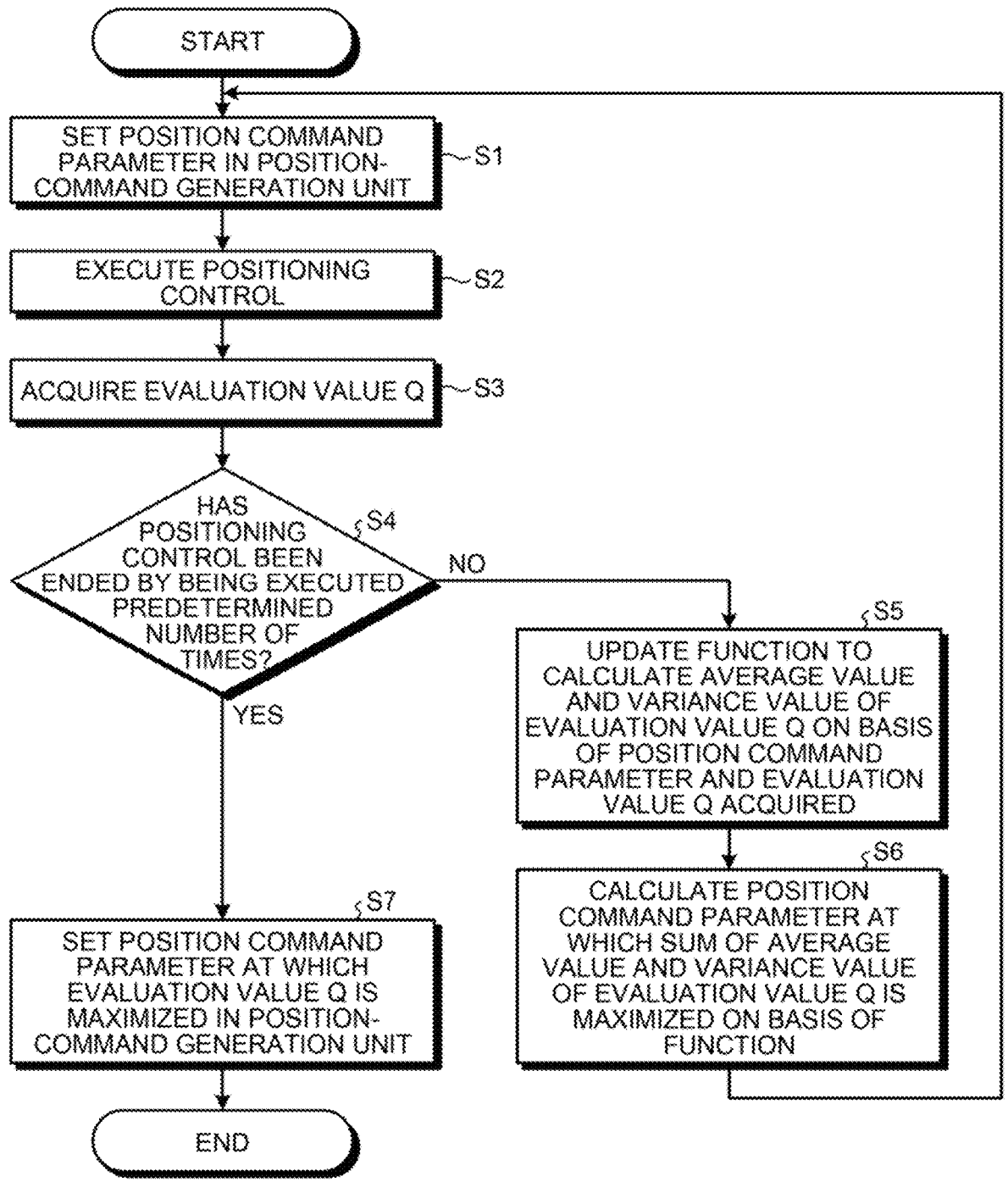
FIG. 14 is a flowchart illustrating an operational procedure when the positioning control device according to the fourth embodiment adjusts a position command parameter.

FIG. 14 is a flowchart illustrating an operational procedure when the positioning control device 40 according to the fourth embodiment adjusts a position command parameter. At Step S1, an initial value of the position command parameter is set in the position-command generation unit 41. The initial value of the position command parameter can be any value. At Step S2, positioning control is executed by a position command calculated on the basis of the position command parameter set at Step S1.

At Step S3, the evaluation unit 43 calculates the evaluation value Q. At Step S4, the positioning control device 40 determines whether positioning control has ended by being executed the number of times determined in advance. At Step S4 in FIG. 14, the number of times determined in advance is described as "predetermined number of times". When the positioning control device 40 determines that positioning control has ended by being executed the number of times determined in advance (YES at S4), the operation of the positioning control device 40 shifts to Step S7. When the positioning control device 40 determines that positioning control has not yet ended or executed the number of times determined in advance (NO at S4), the operation of the positioning control device 40 shifts to Step S5. At Step S5, the learning unit 44 updates the function to calculate an average value of the evaluation value Q and a variance value of the evaluation value Q on the basis of the position command parameter and the evaluation value Q acquired.

At Step S6, the learning unit 44 obtains a position command parameter, at which the sum of the average value and the variance value of the evaluation value Q is maximized, on the basis of the function updated at Step S5. In order to obtain an evaluation value by executing positioning control again using the position command parameter obtained at Step S6, the operation of the positioning control device 40 shifts to Step S1. Meanwhile, at Step S4, when the positioning control device 40 determines that positioning control has ended by being executed the number of times determined in advance (YES at S4), it is in a state in which evaluation values Q have been already obtained, where the number of the evaluation values Q is determined in advance.

At Step S7, the positioning control device 40 selects a position command parameter at which the evaluation value Q is maximized among the evaluation values Q, where the number of the evaluation values Q is determined in advance, and then sets the selected position command parameter in the position-command generation unit 41. When the operation at Step S7 ends, adjustment of the position command parameter ends.

As described above, the learning unit 44 learns a relation between a command parameter and an evaluation value at Step S5, and can obtain an average value and a variance value of the evaluation value Q corresponding to the position command parameter. At Step S6, the learning unit 44 obtains a position command parameter at which the sum of the average value and the variance value of the evaluation value Q is maximized. The obtained position command parameter is used for the next positioning control.

Figure 15:
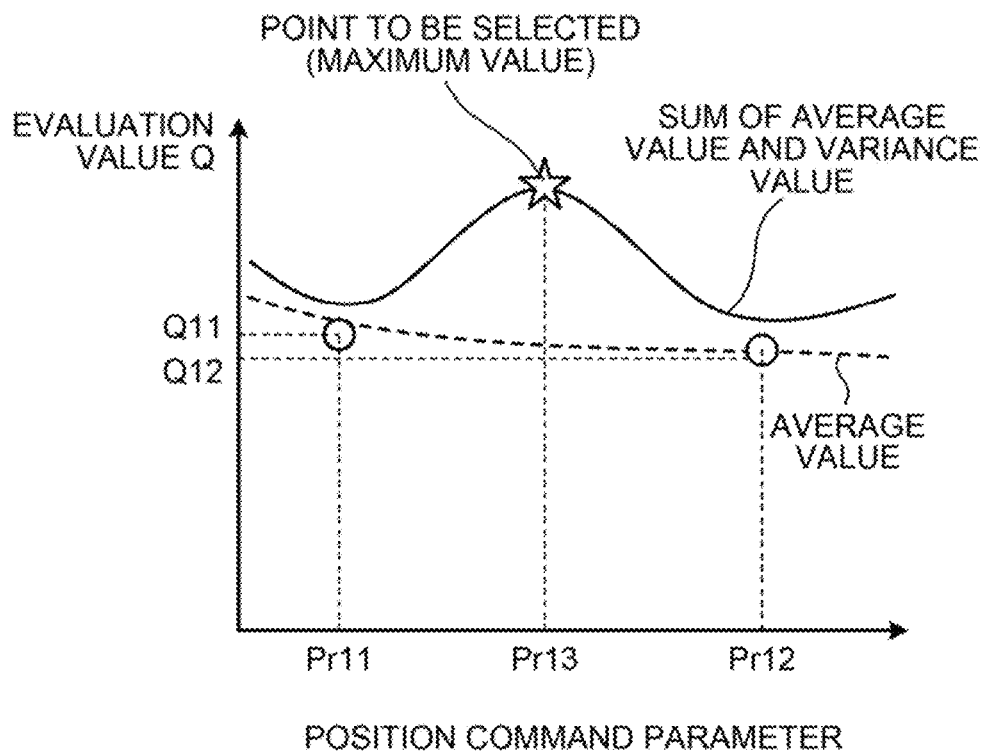
FIG. 15 is a first explanatory diagram describing the effects obtained by the positioning control device according to the fourth embodiment.
Figure 16:
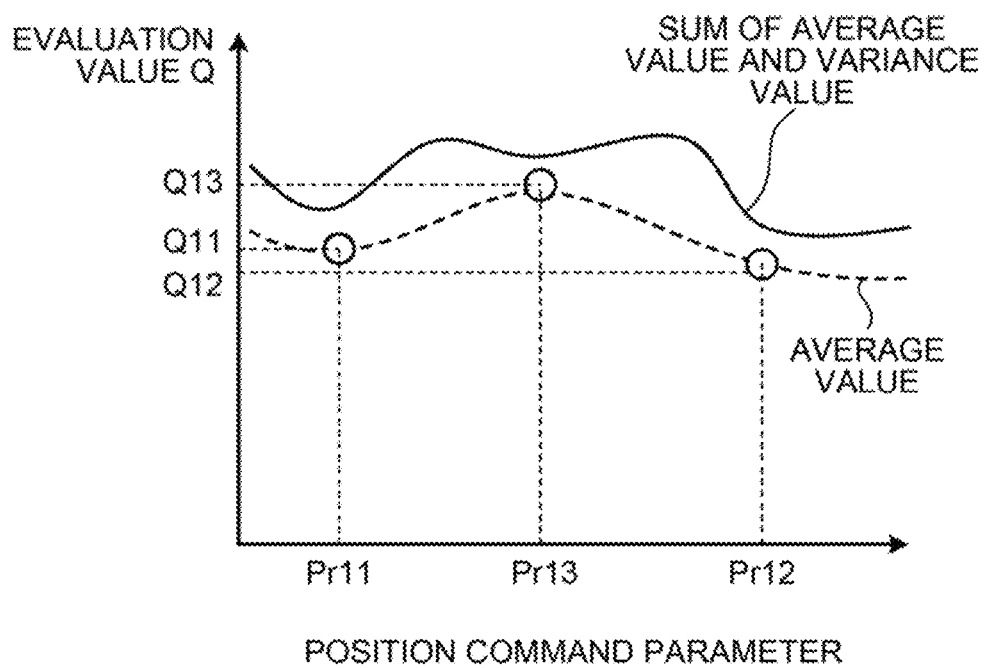
FIG. 16 is a second explanatory diagram describing the effects obtained by the positioning control device according to the fourth embodiment.

Next, descriptions are made on the effects obtained by using the position command parameter, at which the sum of the average value and the variance value is maximized, for the next positioning control. FIG. 15 is a first explanatory diagram describing the effects obtained by the positioning control device 40 according to the fourth embodiment. FIG. 16 is a second explanatory diagram describing the effects obtained by the positioning control device 40 according to the fourth embodiment.

Descriptions are made on a process of selecting the third set of position command parameters after the operation of the evaluation unit 43 and the learning unit 44 is performed twice. The first set of position command parameters is represented as a position command parameter Pr11. The second set of position command parameters is represented as a position command parameter Pr12. The third set of position command parameters is represented as a position command parameter Pr13.

FIG. 15 and FIG. 16 illustrate a position command parameter simplified into a one-dimensional form for explanation purposes. When the operation of the evaluation unit 43 and the learning unit 44 is performed twice, an evaluation value Q11 corresponding to the position command parameter Pr11, and an evaluation value Q12 corresponding to the position command parameter Pr12 are obtained as illustrated by the circles in FIG. 15. The learning unit 44 performs learning on the basis of the evaluation value Q11 and the evaluation value Q12 obtained, and updates the function to calculate an average value and a variance value of the evaluation value Q corresponding to the position command parameter.

FIG. 15 illustrates a curve indicating the average value, and a curve indicating the sum of the average value and the variance value. The curves are calculated on the basis of the function obtained by the learning unit 44. As illustrated in FIG. 15, at an intermediate point between the position command parameter Pr11 and the position command parameter Pr12, as the intermediate point is further from the data acquired, the degree of uncertainty of the evaluation value increases, and the variance value increases accordingly.

Through the operation of the learning unit 44, the position command parameter Pr13 corresponding to the point marked with the star in FIG. 15, at which the sum of the average value and the variance value of the evaluation value is maximized, is selected as the next position command parameter.

As illustrated in FIG. 16, an evaluation value Q13 results from the positioning control executed on the basis of a position command calculated by using the position command parameter Pr13. The evaluation value Q13 is assumed to be larger than the evaluation value Q11 and the evaluation value Q12. When the adjustment ends at this stage, the evaluation value Q13 is maximum. Thus, at the point in time when the adjustment ends, the position command parameter Pr13 is the most excellent parameter.

A case is assumed where at the stage of selecting the third set of position command parameters, a maximum value of the average value of the evaluation value Q is selected, instead of selecting a maximum value of the sum of the average value and the variance value of the evaluation value Q. Since the maximum value on the curve of the average value in FIG. 15 is not at a point corresponding to the position command parameter Pr13, the position command parameter Pr13 is not selected as the third set of position command parameters. Thus, in a case of selecting the maximum value of the average value of the evaluation value Q, there is a possibility that an excellent parameter may not be selected.

As described above, the variance value tends to become larger at the point that is further from the data acquired previously. The average value tends to become larger at the point to be estimated as appropriate on the basis of the data acquired previously. That is, the positioning control device 40 selects the point, at which the sum of the average value and the variance value is maximized, as the next position command parameter, and can thereby appropriately maintain the balance between exploration and exploitation for obtaining a relatively large evaluation value Q, and find a position command parameter by which a relatively large evaluation value Q is obtained at the time when the adjustment ends.

Thus, the positioning control device 40 according to the fourth embodiment can properly adjust the position command parameter without the need for an operator's trial-and-error process. In view of the above, the positioning control device 40 can efficiently adjust an appropriate command shape that speeds up the positioning control.

In the fourth embodiment, the positioning control device 40 selects the point, at which the sum of the average value and the variance value of the evaluation value Q is maximized, as the next position command parameter. However, it is allowable that the positioning control device 40 selects a position command parameter corresponding to the point, at which a value obtained by doubling a variance value and adding the doubled variance value to an average value of the evaluation value Q is maximized, as the next position command parameter. It is allowable that the positioning control device 40 uses an average value and a variance value of an evaluation function obtained by learning to calculate an Expected Improvement (EI) function, a Probability of Improvement (PI) function, or other acquisition functions.

In the fourth embodiment, the positioning control device 40 selects the point, at which the sum of the average value and the variance value of the evaluation value Q is maximized, as the next position command parameter. At this time, in finding the point at which the sum of the average value and the variance value of the evaluation value Q is maximized, the positioning control device 40 may calculate an average value and a variance value of the evaluation value Q in turn by selecting from among the position command parameters at the grid points located at equal intervals, and select a position command parameter, at which the sum of the average value and the variance value of the evaluation value Q is maximized, from the grid points. In addition, in finding the point at which the sum of the average value and the variance value of the evaluation value Q is maximized, the positioning control device 40 may select a position command parameter, at which the average value and the variance value of the evaluation value Q are maximized, by random search on the basis of a pseudo random function.

Fifth Embodiment

The positioning control device 40 according to the fourth embodiment changes a position command parameter by using a relational expression between the position command parameter and the evaluation value Q to thereby adjust the position command parameter properly. In a fifth embodiment, descriptions are made on a positioning control device that properly adjusts a position command parameter by using a pseudo random function.

Figure 17:
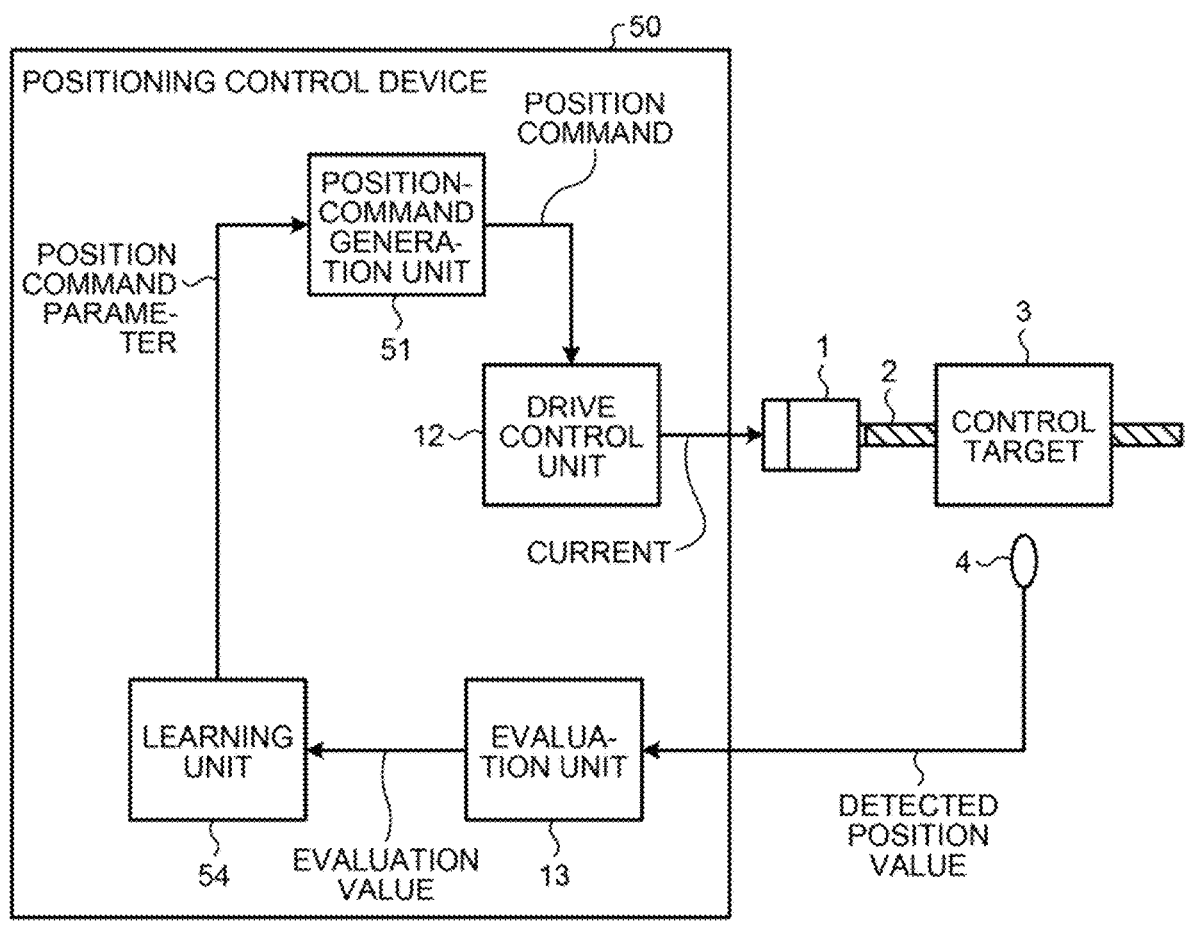
FIG. 17 is a diagram illustrating a configuration of a positioning control device according to a fifth embodiment.

FIG. 17 is a diagram illustrating a configuration of a positioning control device 50 according to the fifth embodiment. In the fifth embodiment, detailed descriptions of the constituent elements explained in the first embodiment are omitted. The positioning control device 50 includes a position-command generation unit 51 that generates a position command for moving the control target 3 by a target movement distance by driving the motor 1 on the basis of a position command parameter that specifies the shape of the position command. The position-command generation unit 51 has a function identical to the function of the position-command generation unit 11 according to the first embodiment. The positioning control device 50 further includes the drive control unit 12 that drives the motor 1 such that a detected position value of the motor 1 or the control target 3 follows the position command generated by the position-command generation unit 51.

The position-command generation unit 51 generates and outputs a position command for the motor 1 to the drive control unit 12. The position command parameter is a parameter that specifies a command shape of the position command. The individual shapes of a position command used in the fifth embodiment, a velocity command obtained by the first-order differential of the position command, an acceleration command obtained by the second-order differential of the position command, and a jerk obtained by the first-order differential of the acceleration command are identical to the shapes illustrated in FIG. 2 in the first embodiment. In the acceleration command in FIG. 2, the trapezoidal shape in the accelerating section from the first section to the third section, and the trapezoidal shape in the decelerating section from the fifth section to the seventh section may not be congruent with each other. It is allowable that the acceleration command is set to 0 for the first time length T1 and the third time length T3 in the accelerating section such that the acceleration command has a rectangular shape. Seven parameters including the first time length T1 to the seventh time length T7 are position command parameters.

The positioning control device 50 further includes the evaluation unit 13 that calculates an evaluation value for evaluating whether positioning control by the drive control unit 12 is executed properly on the basis of the detected position value of the motor 1 or the control target 3 during execution of the positioning control on the control target 3. The positioning control device 50 further includes a learning unit 54 that obtains a learning result by learning a relation between a position command parameter and an evaluation value calculated by the evaluation unit 13 when positioning control is executed on the control target 3 plural times after the position command parameter is changed. The learning unit 54 has a function identical to the function of the learning unit 14 according to the first embodiment.

The learning unit 54 uses the pseudo random function to change a position command generated by the position-command generation unit 51, acquires the evaluation value Q every time positioning control is executed, the control being executed plural times, and learns a relation between the position command parameter and the evaluation value Q. The learning unit 54 changes the shape of an acceleration in each of the accelerating section and decelerating section independently on the basis of the pseudo random function, where the shape is determined on the basis of the position command parameter.

Specifically, the learning unit 54 uses Particle Swarm Optimization (PSO). The PSO is a method for finding a position command parameter such that the evaluation value Q becomes large, while learning a relation between the position command parameter and the evaluation value Q, by means of calculating the evaluation value Q for each particle dispersed in a parameter space, and repetitively updating the position of each particle in the parameter space by using the pseudo random function. One particle corresponds to one position command parameter. For example, in a case where the number of particles is 10, and the number of times of updating is 100, positioning control is executed a total of 1000 times, so that 1000 combinations of the position command parameter and the evaluation value Q are obtained.

Where a particle position before being updated is represented as x(i), and the updated particle position is represented as x(i+1), this updated particle position x(i+1) is calculated by the following equation. "i" is a natural number.

$$x(i+1)=x(i)+v(i+1)$$

$$v(i+1)=w \times v(i)+c1 \times r1 \times (xp-x(i))+c2 \times r2 \times (xg-x(i))$$

In the equation described above, it suffices that w, c1, and c2 are individually a constant and set to a value smaller than 1. r1 and r2 are individually a pseudo random number ranging from 0 to 1 and set by using a pseudo random function. xp is a position command parameter at which the evaluation value Q is maximized among the evaluation values Q obtained from each particle at the first to i-th positions. xg is a position command parameter at which the evaluation value Q is maximized among the evaluation values Q obtained from all the particles at the first to i-th positions.

The initial value of x(i) and the initial value of v(i) are determined randomly by using the pseudo random function. While searching for a position command parameter in a direction in which the evaluation value Q is maximized among the evaluation values Q obtained at the first to i-th positions, the learning unit 54 changes the position command parameter by using the pseudo random function, and can thereby appropriately maintain the balance between exploration and exploitation for obtaining a large evaluation value Q, and find a position command parameter by which a large evaluation value Q is obtained at the time when the adjustment ends.

The learning unit 54 learns a relation between the position command parameter and the evaluation value Q by updating the position of each particle, and can find a position command parameter such that the evaluation value Q becomes large. While the learning unit 54 obtains a relation between the position command parameter and the evaluation value Q as a learning result, it is allowable that the learning unit 54 obtains a list of combinations of the position command parameter and the evaluation value Q as a learning result, or obtains a relational expression between the position command parameter and the evaluation value Q as a learning result.

In the fifth embodiment, the PSO is used as a method for changing the position command parameter on the basis of a pseudo random function. However, instead of the PSO, it is allowable to use an algorism using a pseudo random function, such as genetic algorithm (GA) or simulated annealing (SA). It is allowable that the learning unit 54 changes a position command parameter by random search. By using any of the methods, the learning unit 54 can obtain a relation between the position command parameter and the evaluation value Q as a learning result.

As described above, the learning unit 54 learns a relation between the position command parameter and the evaluation value Q, and can find a position command parameter such that the evaluation value Q becomes large. That is, the learning unit 54 changes a position command parameter to be used for positioning control on the basis of the learning result. Accordingly, the positioning control device 50 can properly adjust the position command parameter without the need for an operator's trial-and-error process.

In view of the above, the positioning control device 50 according to the fifth embodiment can efficiently adjust an appropriate command shape that speeds up the positioning control.

Sixth Embodiment

The positioning control device 40 according to the fourth embodiment changes a position command parameter by using a relational expression between the position command parameter and the evaluation value Q to thereby adjust the position command parameter properly. In a sixth embodiment, descriptions are made on a positioning control device including an operation simulation unit that simulates the operation of a control target to thereby adjust a position command parameter properly.

Figure 18:
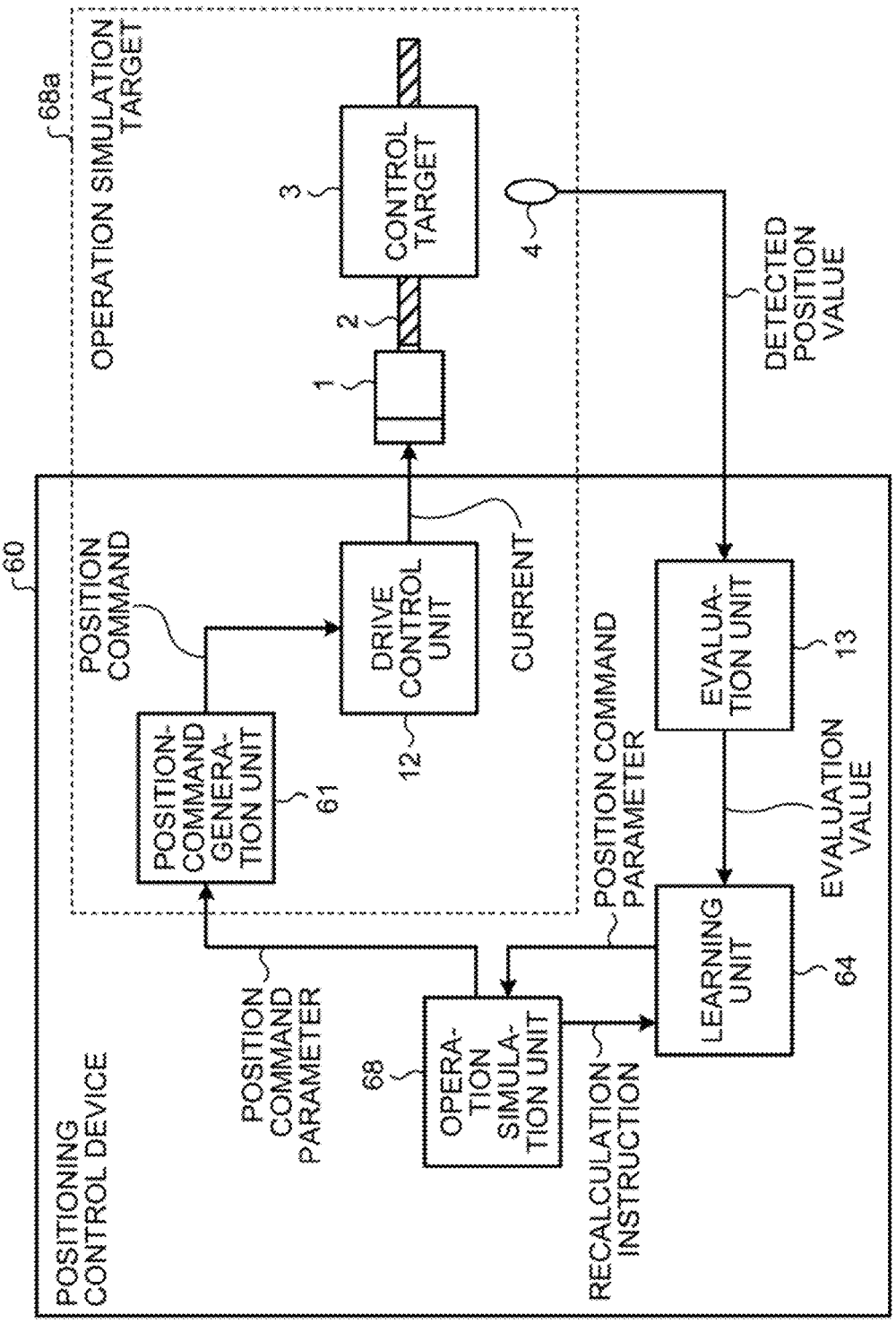
FIG. 18 is a diagram illustrating a configuration of a positioning control device according to a sixth embodiment.

FIG. 18 is a diagram illustrating a configuration of a positioning control device 60 according to the sixth embodiment. In the sixth embodiment, detailed descriptions of the constituent elements explained in the first embodiment are omitted. The positioning control device 60 includes a position-command generation unit 61 that generates a position command for moving the control target 3 by a target movement distance by driving the motor 1 on the basis of a position command parameter that specifies the shape of the position command. The position-command generation unit 61 has a function identical to the function of the position-command generation unit 11 according to the first embodiment. The positioning control device 60 further includes the drive control unit 12 that drives the motor 1 such that the detected position value of the motor 1 or the control target 3 follows the position command generated by the position-command generation unit 61.

The positioning control device 60 further includes the evaluation unit 13 that calculates an evaluation value for evaluating whether positioning control by the drive control unit 12 is executed properly on the basis of the detected position value of the motor 1 or the control target 3 during execution of the positioning control on the control target 3. The positioning control device 60 further includes a learning unit 64 that obtains a learning result by learning a relation between a position command parameter and an evaluation value calculated by the evaluation unit 13 when positioning control is executed on the control target 3 plural times after the position command parameter is changed. The learning unit 64 has a function identical to the function of the learning unit 14 according to the first embodiment.

The positioning control device 60 further includes an operation simulation unit 68 that receives input of a position command parameter and instructs the learning unit 64 to reselect a position command parameter. The operation simulation unit 68 simulates the operation of elements included in an area illustrated by an operation simulation target 68a in FIG. 18. That is, the operation simulation unit 68 receives input of a position command parameter, and simulates a signal of a detected position value indicating the rotational position of the motor 1 or the position of the control target 3. Specifically, the operation simulation unit 68 simulates the operation of the control target 3 on the basis of the position command parameter, and when the result of the simulation satisfies a constraint condition set in advance, the operation simulation unit 68 outputs the position command parameter used for simulating the operation to the position-command generation unit 61.

The operation simulation unit 68 determines whether it is necessary to recalculate the position command parameter on the basis of the signal simulating the detected position value and the constraint condition set in advance. When determining that it is necessary to recalculate the position command parameter, the operation simulation unit 68 provides a recalculation instruction that is an instruction to recalculate the position command parameter to the learning unit 64. The learning unit 64 and the operation simulation unit 68 are further described below.

The learning unit 64 receives input of the evaluation value Q, learns a relation between the position command parameter and the evaluation value Q, and obtains a learning result. Specifically, the learning unit 64 performs learning by updating a function to calculate an average value and a variance value of the evaluation value Q corresponding to the position command parameter. By performing learning, the learning unit 64 is capable of estimating an average value of the evaluation value Q corresponding to the position command parameter, and a variance value of the evaluation value Q corresponding to the position command parameter. It is allowable that the Gaussian process model is used for a function to calculate the average value and the variance value. In the manner as described above, the learning unit 64 obtains a relational expression between the position command parameter and the evaluation value Q.

The learning unit 64 selects a position command parameter for executing the next positioning control, and outputs the selected position command parameter to the operation simulation unit 68. In selecting the next position command parameter, the learning unit 64 selects a position command parameter indicating the maximum value of the sum of an average value and a variance value of the evaluation value Q on the basis of a learning result.

The operation simulation unit 68 receives the position command parameter selected by the learning unit 64, and determines whether it is necessary to recalculate the position command parameter on the basis of the signal simulating the detected position value and the constraint condition set in advance. When determining that it is necessary to recalculate the position command parameter, the operation simulation unit 68 provides a recalculation instruction that is an instruction to recalculate the position command parameter to the learning unit 64.

It is allowable that when the amplitude of a signal simulating the detected position value is equal to or larger than a value determined in advance, the operation simulation unit 68 provides a recalculation instruction to recalculate the position command parameter to the learning unit 64. It is also allowable that when the time required for a signal simulating the detected position value to reach a value of the target movement distance is equal to or longer than a time determined in advance, the operation simulation unit 68 provides a recalculation instruction to recalculate the position command parameter to the learning unit 64. That is, in a case where, without executing positioning control by driving the motor 1, the position command parameter is evaluated in a simplified manner, and where the evaluation value becomes a value determined in advance, which is so small as to be inappropriate, then the operation simulation unit 68 causes the learning unit 64 to reselect a position command parameter.

When the instruction to recalculate the position command parameter is provided to the learning unit 64, the learning unit 64 selects a position command parameter at which the sum of the average value and the variance value of the evaluation value Q becomes the second largest value on the basis of the learning result. The operation simulation unit 68 receives the position command parameter again, and determines whether it is necessary to recalculate the position command parameter.

Through the operation of the learning unit 64 and the operation simulation unit 68, when the position command parameter is evaluated in a simplified manner and then the evaluation value becomes so small as to be determined as inappropriate, the position command parameter is changed. The positioning control device 60 can reduce the number of times of positioning control to be executed by changing the position command parameter on the basis of the operation of the learning unit 64 and the operation simulation unit 68, and can also efficiently adjust the position command parameter.

The operation simulation unit 68 can reduce the number of times of positioning control to be executed by solely determining whether the evaluation value Q corresponding to the input position command parameter is large or small. It is not always necessary for the operation simulation unit 68 to precisely simulate a control target. For example, a signal in which a low-pass filter is applied to a position command may be a signal simulating the detected position value.

In the sixth embodiment, the operation simulation unit 68 determines whether it is necessary to recalculate the position command parameter on the basis of a signal simulating the detected position value. However, the operation of the operation simulation unit 68 is not limited thereto. Elements to be included in the operation simulation target 68a are not limited to the elements illustrated in FIG. 18. For example, it is allowable that the operation simulation unit 68 simulates a value of a current to be supplied to the motor 1, and when the simulated value of the current is equal to or larger than a value determined in advance, the operation simulation unit 68 instructs recalculation of the position command parameter.

It is allowable that the operation simulation unit 68 simulates a position command to be generated from a position command parameter, and when the time required for a signal simulating the position command to reach the value of a target movement distance is equal to or longer than a time determined in advance, the operation simulation unit 68 instructs recalculation of the position command parameter. It is also allowable that the operation simulation unit 68 differentiates a signal in which a low-pass filter is applied to a position command to thereby simulate a velocity command or an acceleration command, and when the maximum value of a signal simulating the velocity command or the acceleration command is equal to or larger than a value determined in advance, the operation simulation unit 68 instructs recalculation of the position command parameter.

Thus, the positioning control device 60 according to the sixth embodiment can properly adjust the position command parameter without the need for an operator's trial-and-error process. In view of the above, the positioning control device 60 can efficiently adjust an appropriate command shape that speeds up the positioning control.

Some or all of the positioning control devices 10, 20, 30, 40, 50, and 60 according to the first to sixth embodiments described above may set two or more of the accelerations at the time points of the start of acceleration, the end of acceleration, the start of deceleration, and the end of deceleration independently in accordance with the position command parameter.

It is allowable that some or all of the functions of the position-command generation unit 41, the drive control unit 12, the evaluation unit 43, and the learning unit 44 that are included in the positioning control device 40 according to the fourth embodiment are implemented by a processor equivalent to the processor 71. In a case where the some or all of the functions are implemented by the processor, the positioning control device 40 includes a memory that stores therein programs with which steps executed by some or all of the position-command generation unit 41, the drive control unit 12, the evaluation unit 43, and the learning unit 44 are executed as a result. The memory is a memory equivalent to the memory 72.

It is allowable that some or all of the functions of the position-command generation unit 41, the drive control unit 12, the evaluation unit 43, and the learning unit 44 that are included in the positioning control device 40 according to the fourth embodiment are implemented by a processing circuitry equivalent to the processing circuitry 81.

It is allowable that some or all of the functions of the position-command generation unit 51, the drive control unit 12, the evaluation unit 13, and the learning unit 54 that are included in the positioning control device 50 according to the fifth embodiment are implemented by a processor equivalent to the processor 71. In a case where the some or all of the functions are implemented by the processor, the positioning control device 50 includes a memory that stores therein programs with which steps executed by some or all of the position-command generation unit 51, the drive control unit 12, the evaluation unit 13, and the learning unit 54 are executed as a result. The memory is a memory equivalent to the memory 72.

It is allowable that some or all of the functions of the position-command generation unit 51, the drive control unit 12, the evaluation unit 13, and the learning unit 54 that are included in the positioning control device 50 according to the fifth embodiment are implemented by a processing circuitry equivalent to the processing circuitry 81.

It is allowable that some or all of the functions of the position-command generation unit 61, the drive control unit 12, the evaluation unit 13, the learning unit 64, and the operation simulation unit 68 that are included in the positioning control device 60 according to the sixth embodiment are implemented by a processor equivalent to the processor 71. In a case where the some or all of the functions are implemented by the processor, the positioning control device 60 includes a memory that stores therein programs with which steps executed by some or all of the position-command generation unit 61, the drive control unit 12, the evaluation unit 13, the learning unit 64, and the operation simulation unit 68 are executed as a result. The memory is a memory equivalent to the memory 72.

It is allowable that some or all of the functions of the position-command generation unit 61, the drive control unit 12, the evaluation unit 13, the learning unit 64, and the operation simulation unit 68 that are included in the positioning control device 60 according to the sixth embodiment are implemented by a processing circuitry equivalent to the processing circuitry 81.

The configurations described in the above embodiments are only examples of the content of the present invention. The configurations can be combined with other well-known techniques, and part of each of the configurations can be omitted or modified without departing from the gist of the present invention.

REFERENCE SIGNS LIST

1 motor, 2 ball screw, 3 control target, 4 position detector, 10, 20, 30, 40, 50, 60 positioning control device, 11, 41, 51, 61 position-command generation unit, 12 drive control unit, 13, 33, 43 evaluation unit, 14, 44, 54, 64 learning unit, 15, 25 learning-result holding unit, 16, 26 parameter-range setting unit, 17, 27 running condition, 68 operation simulation unit, 68a operation simulation target, 71 processor, 72 memory, 81 processing circuitry.

The invention claimed is:

1. A positioning control device that moves a control target by a target movement distance by driving a motor, the positioning control device comprising:
a position-command generating circuitry to generate a position command by which a shape of an acceleration in an accelerating section and a shape of an acceleration in a decelerating section are determined on a basis of a position command parameter;
a controlling circuitry to drive the motor such that a detected position value of the motor or the control target follows the position command;
an evaluating circuitry to calculate an evaluation value that is a numerical value for evaluating quality of positioning control on the control target on a basis of a detected position value of the motor or the control target during execution of the positioning control on the control target; and
a learning circuitry to learn a relation between a plurality of parameters included in the position command parameter and the evaluation value when the positioning control is executed plural times, while changing the shape of the acceleration in the accelerating section and the shape of the acceleration in the decelerating section independently, the shapes of the accelerations in the accelerating section and the decelerating section being determined on a basis of the position command parameter, and to obtain, as a learning result, a relational expression indicating a relation between the evaluation value and the position command parameter within a parameter range that specifies an upper limit value and a lower limit value, of each of the parameters defining the position command parameter.

2. The positioning control device according to claim 1, wherein the learning circuitry obtains a function to output an estimated value of the evaluation value corresponding to the position command parameter, or a function to output an estimated value of an average value and a variance value of the evaluation value as the learning result.

3. The positioning control device according to claim 1, further comprising an operation simulating circuitry to simulate an operation of the control target on a basis of the position command parameter, and to output a position command parameter used for simulating the operation to the position-command generating circuitry when a result of simulation satisfies a constraint condition set in advance.

4. The positioning control device according to claim 1, further comprising a parameter-range setting circuitry to set the parameter range that specifies the upper-limit value and the lower-limit value of the position command parameter on a basis of the learning result obtained by the learning circuitry.

5. The positioning control device according to claim 4, further comprising a learning-result holding circuitry to hold therein the learning result obtained by the learning circuitry in association with a running condition including information indicating the target movement distance, wherein
the learning-result holding circuitry holds therein the position command parameter as an excellent parameter, where number of the position command parameter is equal to or larger than one, and
the parameter-range setting circuitry sets the parameter range by defining a value smaller than the excellent parameter held by the learning-result holding circuitry as a lower limit of the parameter range, and by defining a value larger than the excellent parameter held by the learning-result holding circuitry as an upper limit of the parameter range.

6. The positioning control device according to claim 4, further comprising a learning-result holding circuitry to hold therein the learning result obtained by the learning circuitry in association with a running condition including information indicating the target movement distance, wherein
the learning-result holding circuitry holds therein the position command parameter at which the evaluation value is maximized as a first excellent parameter, and
when there is a change in the target movement distance indicated by the information included in the running condition, the parameter-range setting circuitry performs interpolation calculation on a basis of a target movement distance at a time when learning has been performed previously to estimate a first excellent parameter at an interpolating point corresponding to a changed target movement distance, and sets the parameter range by defining a value smaller than the first excellent parameter estimated at the interpolating point as a lower limit of the parameter range, and by defining a value larger than the first excellent parameter estimated at the interpolating point as an upper limit of the parameter range.

7. The positioning control device according to claim 4, further comprising a learning-result holding circuitry to hold therein the learning result obtained by the learning circuitry in association with a running condition including information on a target stopping position of the control target, wherein the learning-result holding circuitry holds therein the position command parameter at which the evaluation value is maximized as a second excellent parameter, and when there is a change in the target stopping position indicated by the information included in the running condition, the parameter-range setting circuitry performs interpolation calculation on a basis of a target stopping position at a time when learning has been performed previously to estimate a second excellent parameter at an interpolating point corresponding to a changed target stopping position, and sets the parameter range by defining a value smaller than the second excellent parameter estimated at the interpolating point as a lower limit of the parameter range, and by defining a value larger than the second excellent parameter estimated at the interpolating point as an upper limit of the parameter range.

8. The positioning control device according to claim 1, wherein the position-command generating circuitry is a learner to generate the position command when a position command parameter obtained by learning in the learning circuitry is set in the learner.

9. A positioning method for moving a control target by a target movement distance by driving a motor, the positioning method comprising:

generating a position command by which a shape of an acceleration in an accelerating section and a shape of an acceleration in a decelerating section are determined on a basis of a position command parameter;

driving the motor such that a detected position value of the motor or the control target follows the position command;

calculating an evaluation value that is a numerical value for evaluating quality of positioning control on the control target on a basis of a detected position value of the motor or the control target during execution of the positioning control on the control target;

learning a relation between a plurality of parameters included in the position command parameter and the evaluation value when the positioning control is executed plural times, while changing the shape of acceleration in the accelerating section and the shape of the acceleration in the decelerating section independently, the shapes of the accelerations in the accelerating section and the decelerating section being determined on a basis of the position command parameter;

learning a relational expression indicating a relation between the evaluation value and the position command parameter within a parameter range that specifies an upper limit value and a lower limit value, of each of the parameters defining the position command parameter and;

determining a newly-set position command parameter on a basis of a learning result.

10. A positioning control device that moves a control target by a target movement distance by driving a motor, the positioning control device comprising:

a position-command generating circuitry to generate a position command by which a shape of an acceleration in an accelerating section and a shape of an acceleration in a decelerating section are determined on a basis of a position command parameter;

a drive controlling circuitry to drive the motor such that a detected position value of the motor or the control target follows the position command;

an evaluating circuitry to calculate an evaluation value that is a numerical value for evaluating quality of positioning control on the control target on a basis of a detected position value of the motor or the control target during execution of the positioning control on the control target; and a learning circuitry to obtain a learning result by learning a relation between a plurality of parameters included in the position command parameter and the evaluation value when the positioning control is executed plural times, while changing the shape of the acceleration in the accelerating section and the shape of the acceleration in the decelerating section independently on a basis of a pseudo random function and a position command parameter at which an evaluation value is maximized among position command parameters used for positioning control executed, the shapes of the accelerations in the accelerating section and the decelerating section being determined on a basis of the position command parameter.

11. A positioning control device that moves a control target by a target movement distance by driving a motor, the positioning control device comprising:

a position-command generating circuitry to generate a position command by which a shape of an acceleration in an accelerating section and a shape of an acceleration in a decelerating section are determined on a basis of a position command parameter, the position command having a section during which a jerk is a nonzero constant in each of the accelerating section and the decelerating section;

a drive controlling circuitry to drive the motor such that a detected position value of the motor or the control target follows the position command;

an evaluating circuitry to calculate an evaluation value that is a numerical value for evaluating quality of positioning control on the control target on a basis of a detected position value of the motor or the control target during execution of the positioning control on the control target;

a learning circuitry to learn a relation between a plurality of parameters included in the position command parameter and the evaluation value when the positioning control is executed plural times, while changing the shape of the acceleration in the accelerating section and the shape of the acceleration in the decelerating section independently, of the shapes of the accelerations in the accelerating section and the decelerating section being determined on a basis of the position command parameter, and to obtain, as a learning result, a relation between the position command parameter and the evaluation value.

12. The positioning control device according to claim 10, further comprising an operation simulating circuitry to simulate an operation of the control target on a basis of the position command parameter, and to output a position command parameter used for simulating the operation to the position-command generating circuitry when a result of simulation satisfies a constraint condition set in advance.

13. The positioning control device according to claim 11, further comprising an operation simulating circuitry to simulate an operation of the control target on a basis of the position command parameter, and to output a position command parameter used for simulating the operation to the position-command generating circuitry when a result of simulation satisfies a constraint condition set in advance.

14. The positioning control device according to claim 10, further comprising a parameter-range setting circuitry to set a parameter range that specifies an upper-limit value and a lower-limit value of the position command parameter on a basis of the learning result obtained by the learning circuitry.

15. The positioning control device according to claim 14, further comprising a learning-result holding circuitry to hold therein the learning result obtained by the learning circuitry in association with a running condition including information indicating the target movement distance, wherein
the learning-result holding circuitry holds therein the position command parameter as an excellent parameter, where number of the position command parameter is equal to or larger than one, and
the parameter-range setting circuitry sets the parameter range by defining a value smaller than the excellent parameter held by the learning-result holding circuitry as a lower limit of the parameter range, and by defining a value larger than the excellent parameter held by the learning-result holding circuitry as an upper limit of the parameter range.

16. The positioning control device according to claim 11, further comprising a learning-result holding circuitry to hold therein the learning result obtained by the learning circuitry in association with a running condition including information indicating the target movement distance, wherein
the learning-result holding circuitry holds therein the position command parameter as an excellent parameter, where number of the position command parameter is equal to or larger than one, and
the parameter-range setting circuitry sets the parameter range by defining a value smaller than the excellent parameter held by the learning-result holding circuitry as a lower limit of the parameter range, and by defining a value larger than the excellent parameter held by the learning-result holding circuitry as an upper limit of the parameter range.

17. The positioning control device according to claim 14, further comprising a learning-result holding circuitry to hold therein the learning result obtained by the learning circuitry in association with a running condition including information indicating the target movement distance, wherein
the learning-result holding circuitry holds therein the position command parameter at which the evaluation value is maximized as a first excellent parameter, and
when there is a change in the target movement distance indicated by the information included in the running condition, the parameter-range setting circuitry performs interpolation calculation on a basis of a target movement distance at a time when learning has been performed previously to estimate a first excellent parameter at an interpolating point corresponding to a changed target movement distance, and sets the parameter range by defining a value smaller than the first excellent parameter estimated at the interpolating point as a lower limit of the parameter range, and by defining a value larger than the first excellent parameter estimated at the interpolating point as an upper limit of the parameter range.

18. The positioning control device according to claim 11, further comprising a learning-result holding circuitry to hold therein the learning result obtained by the learning circuitry in association with a running condition including information indicating the target movement distance, wherein
the learning-result holding circuitry holds therein the position command parameter at which the evaluation value is maximized as a first excellent parameter, and
when there is a change in the target movement distance indicated by the information included in the running condition, the parameter-range setting circuitry performs interpolation calculation on a basis of a target movement distance at a time when learning has been performed previously to estimate a first excellent parameter at an interpolating point corresponding to a changed target movement distance, and sets the parameter range by defining a value smaller than the first excellent parameter estimated at the interpolating point as a lower limit of the parameter range, and by defining a value larger than the first excellent parameter estimated at the interpolating point as an upper limit of the parameter range.

19. The positioning control device according to claim 14, further comprising a learning-result holding circuitry to hold therein the learning result obtained by the learning circuitry in association with a running condition including information on a target stopping position of the control target, wherein
the learning-result holding circuitry holds therein the position command parameter at which the evaluation value is maximized as a second excellent parameter, and
when there is a change in the target stopping position indicated by the information included in the running condition, the parameter-range setting circuitry performs interpolation calculation on a basis of a target stopping position at a time when learning has been performed previously to estimate a second excellent parameter at an interpolating point corresponding to a changed target stopping position, and sets the parameter range by defining a value smaller than the second excellent parameter estimated at the interpolating point as a lower limit of the parameter range, and by defining a value larger than the second excellent parameter estimated at the interpolating point as an upper limit of the parameter range.

20. The positioning control device according to claim 11, further comprising a learning-result holding circuitry to hold therein the learning result obtained by the learning circuitry in association with a running condition including information on a target stopping position of the control target, wherein
the learning-result holding circuitry holds therein the position command parameter at which the evaluation value is maximized as a second excellent parameter, and
when there is a change in the target stopping position indicated by the information included in the running condition, the parameter-range setting circuitry performs interpolation calculation on a basis of a target stopping position at a time when learning has been performed previously to estimate a second excellent parameter at an interpolating point corresponding to a changed target stopping position, and sets the parameter range by defining a value smaller than the second excellent parameter estimated at the interpolating point as a lower limit of the parameter range, and by defining a value larger than the second excellent parameter estimated at the interpolating point as an upper limit of the parameter range.

21. The positioning control device according to claim 10, wherein the position-command generating circuitry is a learner to generate the position command when a position command parameter obtained by learning in the learning circuitry is set in the learner.

22. The positioning control device according to claim 11, wherein the position-command generating circuitry is a learner to generate the position command when a position command parameter obtained by learning in the learning circuitry is set in the learner.

23. A positioning method for moving a control target by a target movement distance by driving a motor, the positioning method comprising:
   generating a position command by which a shape of an acceleration in an accelerating section and a shape of an acceleration in a decelerating section are determined on a basis of a position command parameter;
   driving the motor such that a detected position value of the motor or the control target follows the position command;
   calculating an evaluation value that is a numerical value for evaluating quality of positioning control on the control target on a basis of a detected position value of the motor or the control target during execution of the positioning control on the control target;
   learning a relation between a plurality of parameters included in the position command parameter and the evaluation value when the positioning control is executed plural times, while changing the shape of the acceleration in an accelerating section and the shape of the acceleration in the decelerating section independently on a basis of a pseudo random function and a position command parameter at which an evaluation value is maximized among position command parameters used for positioning control executed, each of the shapes of the accelerations in the accelerating section and the decelerating section being determined on a basis of the position command parameter, and
   determining a newly-set position command parameter on a basis of a learning result.

24. A positioning method for moving a control target by a target movement distance by driving a motor, the positioning method comprising:
   generating a position command by which a shape of an acceleration in an accelerating section and a shape of an acceleration in a decelerating section are determined on a basis of a position command parameter, the position command having a section during which a jerk is a nonzero constant in each of the accelerating section and the decelerating section;
   driving the motor such that a detected position value of the motor or the control target follows the position command;
   calculating an evaluation value that is a numerical value for evaluating quality of positioning control on the control target on a basis of a detected position value of the motor or the control target during execution of the positioning control on the control target;
   learning a relation between a plurality of parameters included in the position command parameter and the evaluation value when the positioning control is executed plural times, while changing the shape of the acceleration in the accelerating section and the shape of the acceleration in the decelerating section independently, the shapes of the accelerations in the accelerating section and the decelerating section being determined on a basis of the position command parameter; and
   determining a newly-set position command parameter on a basis of a learning result.

25. The positioning control device according to claim 1, wherein the evaluating circuitry calculates an evaluation value on a basis of the detected position value, using a positioning time from start of the positioning control to completion of positioning of the control target, and at the completion of positioning of the control target, a deviation between the target movement distance and the detected position value becomes smaller than an allowable value.

26. The positioning control device according to claim 1, wherein the evaluating circuitry calculates an evaluation value on a basis of either only a positioning time from start of the positioning control to completion of positioning of the control target, at the completion of positioning of the control target, a deviation between the target movement distance and the detected position value becoming smaller than allowable value or the positioning time and a deviation of residual vibrations after a deviation between the target movement distance and the detected position value becomes smaller than an allowable value.

* * * * *